United States Patent
Mizuno

(10) Patent No.: US 8,879,086 B2
(45) Date of Patent: Nov. 4, 2014

(54) PRINTING APPARATUS, CONTROL METHOD THEREFOR, AND STORAGE MEDIUM

(75) Inventor: Takafumi Mizuno, Higashimurayama (JP)

(73) Assignee: Canon Kabushiki Kaisha (JP)

( * ) Notice: Subject to any disclaimer, the term of this patent is extended or adjusted under 35 U.S.C. 154(b) by 201 days.

(21) Appl. No.: 13/524,048

(22) Filed: Jun. 15, 2012

(65) Prior Publication Data

US 2012/0327463 A1   Dec. 27, 2012

(30) Foreign Application Priority Data

Jun. 23, 2011  (JP) .................................. 2011-139860

(51) Int. Cl.
- *G06K 15/00* (2006.01)
- *G06K 15/02* (2006.01)
- *G06F 3/12* (2006.01)

(52) U.S. Cl.
CPC .............. *G06F 3/122* (2013.01); *G06K 15/005* (2013.01); *G06F 3/1271* (2013.01); *G06K 15/405* (2013.01); *G06F 3/1288* (2013.01); *G06K 15/1886* (2013.01); *G06F 3/1273* (2013.01)

USPC ......................................... 358/1.14; 358/1.15

(58) Field of Classification Search
CPC ... G06F 3/1239; G06F 3/1273; G06F 3/1271; G06K 15/4095; G06K 15/405; G06K 15/1886; G06K 15/005
See application file for complete search history.

(56) References Cited

U.S. PATENT DOCUMENTS

| | | | |
|---|---|---|---|
| 7,644,241 B2 * | 1/2010 | Mizuno | 711/158 |
| 2007/0201091 A1 * | 8/2007 | Tanaka | 358/1.16 |
| 2011/0007340 A1 * | 1/2011 | Masuyama | 358/1.14 |

FOREIGN PATENT DOCUMENTS

JP   2006-056109 A   3/2006

\* cited by examiner

*Primary Examiner* — Dov Popovici
(74) *Attorney, Agent, or Firm* — Rossi, Kimms & McDowell LLP

(57) ABSTRACT

A printing apparatus according to this invention stores history information of a printed job, displays a list of jobs to be reprinted based on the stored job history information, and reprints a job selected from the displayed list of jobs to be reprinted. The printing apparatus restricts reprinting based on history information of a job using data obtained from a file server on a network.

12 Claims, 16 Drawing Sheets

FIG. 5A

| 501 | 502 | 503 | 504 | 505 | 506 |
|---|---|---|---|---|---|
| JOB TYPE | DATE & TIME | USER ID | PRINT SETTING SAVE DESTINATION | PRINT IMAGE DATA SAVE DESTINATION | EXTERNAL FILE ATTRIBUTE ID |
| COPY | 2011.1.3 10:24:14 | yamada | 00102.setting | 00102.img | - |
| PDL | 2011.1.4 08:47:52 | suzuki | 00108.setting | 00108.img | - |
| FILE | 2011.1.4 17:33:29 | arai | 00111.setting | 00111.img | - |
| NET | 2011.1.5 14:27:17 | suzuki | 00135.setting | 00135.img | 28 |
| | | | | | |

FIG. 5B

| 507 | 508 | 509 | 510 | 511 | 512 |
|---|---|---|---|---|---|
| ID | REFERENCE DESTINATION URL | PROTOCOL | UPDATE DATE & TIME | FILE SIZE | FILE OWNER |
| 28 | \\192.168.3.5\share\a.pdf | CIFS | 2010.9.8 09:51:03 | 30291byte | yoshida |
| | | | | | |

FIG. 6A

| | JOB TYPE | DATE & TIME | USER ID | PRINT SETTING SAVE DESTINATION | PRINT IMAGE DATA SAVE DESTINATION | EXTERNAL FILE ATTRIBUTE ID |
|---|---|---|---|---|---|---|
| 601 | COPY | 2011.1.3 10:24:14 | yamada | 00102.setting | 00102.img | - |
| 602 | PDL | 2011.1.4 08:47:52 | suzuki | 00108.setting | 00108.img | - |
| 603 | NET | 2011.1.7 17:33:29 | yamada | 00111.setting | 00111.img | 28 |
| 604 | PDL | 2011.1.25 14:27:17 | arai | 00135.setting | 00135.img | - |
| 605 | COPY | 2011.2.1 12:59:48 | yamada | 00139.setting | 00139.img | - |
| 606 | NET | 2011.2.2 07:36:12 | murata | 00162.setting | 00162.img | 29 |

FIG. 6B

| ID | REFERENCE DESTINATION URL | PROTOCOL | UPDATE DATE & TIME | FILE SIZE | FILE OWNER |
|---|---|---|---|---|---|
| 28 | ¥¥192.168.3.5¥share¥a.pdf | CIFS | 2010.9.8 09:51:03 | 30291byte | yoshida |
| 29 | http://192.168.41.82/users/b.tiff | WebDAV | 2011.1.10 21:23:53 | 8287byte | murata |

FIG. 7A

```
REPRINT
        JOB TYPE   PRINTING DATE & TIME    URL
701 ─── COPY       2011.1.3 10:24:14
702 ─── NET        2011.1.7 17:33:29       ¥¥192.168.3.5¥share¥a.pdf
703 ─── COPY       2011.2.1 12:59:48

1/1 ◄►
                                           REPRINT    CANCEL
                                              │
                                             704
```

FIG. 7B

DO YOU USE THE SAME SETTINGS AS
THOSE IN PREVIOUS PRINTING?

Yes    No

FIG. 16A

| | JOB TYPE | DATE & TIME | USER ID | PRINT SETTING SAVE DESTINATION | PRINT IMAGE DATA SAVE DESTINATION | EXTERNAL FILE ATTRIBUTE ID |
|---|---|---|---|---|---|---|
| 1601 | COPY | 2010.12.6 08:25:11 | yamada | 00215.setting | 00215.img | - |
| 1602 | NET | 2011.1.4 06:59:53 | yamada | 00275.setting | 00275.img | 49 |
| 1603 | PDL | 2011.1.6 18:38:17 | yamada | 00280.setting | 00280.img | - |
| 1604 | NET | 2011.2.10 22:13:31 | yamada | 00421.setting | 00421.img | 58 |
| 1605 | COPY | 2011.2.27 08:59:31 | yamada | 00496.setting | 00496.img | - |
| 1606 | NET | 2011.3.2 21:00:01 | yamada | 00511.setting | 00511.img | 63 |

FIG. 16B

| | ID | REFERENCE DESTINATION URL | PROTOCOL | UPDATE DATE & TIME | FILE SIZE | FILE OWNER |
|---|---|---|---|---|---|---|
| 1607 | 49 | \\192.168.3.5\share\a.pdf | CIFS | 2010.9.8 09:51:03 | 30291byte | yoshida |
| 1608 | 58 | http://192.168.41.82/users/b.tiff | WebDAV | 2011.1.10 21:23:53 | 8287byte | yamada |
| 1609 | 63 | \\192.168.3.5\share\c.pdf | CIFS | 2010.12.3 12:43:08 | 5013byte | murata |

FIG. 17

| REPRINT | | | |
|---|---|---|---|
| UPDATE | JOB TYPE | PRINTING DATE & TIME | URL |
| | COPY | 2011.12.6 08:25:11 | |
| | NET | 2011.1.4 06:59:53 | ¥¥192.168.3.5¥share¥a.pdf |
| | PDL | 2011.1.6 18:38:17 | |
| ● | NET | 2011.2.10 22:13:31 | http://192.168.41.82/users/b.tiff |
| | COPY | 2011.2.27 08:59:31 | |

1701

1/1 ▲▼

REPRINT  CANCEL

FIG. 18

| REPRINT | | | |
|---|---|---|---|
| UPDATE | JOB TYPE | PRINTING DATE & TIME | URL |
| | COPY | 2011.12.6 08:25:11 | |
| | NET | 2011.1.4 06:59:53 | \\192.168.3.5\share\a.pdf |
| | PDL | 2011.1.6 18:38:17 | |
| ● | NET | 2011.2.10 22:13:31 | http://192.168.41.82/users/b.tiff |
| ● | COPY | 2011.2.27 08:59:31 | |
| | NET | 2011.2.1 12:59:48 | \\192.168.3.5\share\c.pdf |

1801 — (fourth row marker)
1802 — (fifth row marker)

REPRINT   CANCEL   1/1 ▲▼

PRINTING APPARATUS, CONTROL METHOD THEREFOR, AND STORAGE MEDIUM

BACKGROUND OF THE INVENTION

1. Field of the Invention

The present invention relates to a printing apparatus, control method therefor, and storage medium.

2. Description of the Related Art

Recently, an image forming apparatus includes a storage device such as a hard disk (HDD). Upon executing a job such as copying in the storage device, the image forming apparatus saves an execution history of the job and reprints the same image data from the execution history. To execute reprinting based on the job execution history, the image forming apparatus saves image data to be printed and print setting data in the storage device.

There is known an image forming apparatus having a so-called pull print function of designating a URI of an external apparatus such as a file server on a network, accessing data stored in the file server, and obtaining the data. Data obtained from the apparatus such as the file server is also reprinted (for example, Japanese Patent Laid-Open No. 2006-56109).

A plurality of apparatuses on the network as well as the above-mentioned image processing apparatus access data stored in the file server. In some cases, another apparatus or the image processing apparatus itself accesses and updates data. When data printed using the pull print function is stored for reprinting in the storage device of the image forming apparatus, the contents of the data stored in the file server may have changed from those of the data stored for reprinting.

A case in which reprinting is executed based on the history of a job printed using the pull print function will be assumed. In this case, it cannot be determined which data the user who designates reprinting wants to reprint, the latest data stored in the file server or the same data as data of a job printed once. In a case where the user designates execution of reprinting, if execution of reprinting for data (job) which may have been updated in the file server is designated, the user may not be able to obtain the printing result he wants.

SUMMARY OF THE INVENTION

The present invention solves the above-described conventional problems. The present invention provides a technique of, when reprinting for a printed job, presenting jobs to be reprinted to the user to prompt him to select one of them, thereby preventing generation of a printing result he does not want.

According to one aspect of the present invention, there is provided a printing apparatus comprising: a storage unit configured to store an execution history of a print job; a reprint unit configured to execute reprinting based on the execution history of the print job that is stored in the storage unit; and a control unit configured to restrict reprinting based on an execution history of a print job for printing data obtained by accessing data stored in a file server on a network, out of execution histories of print jobs that are stored in the storage unit.

According to another aspect of the present invention, there is provided a method for controlling a printing apparatus, comprising: storing an execution history of a print job in a storage unit; executing reprinting based on the execution history of the print job that is stored in the storage unit; and restricting reprinting based on an execution history of a print job for printing data obtained by accessing data stored in a file server on a network, out of execution histories of print jobs that are stored in the storage unit.

According to the present invention, when reprinting a printed job, generation of a printing result the user does not want can be prevented.

Further features of the present invention will become apparent from the following description of exemplary embodiments (with reference to the attached drawings).

BRIEF DESCRIPTION OF THE DRAWINGS

FIGS. 5A and 5B are tables exemplifying a history management table stored in a history manager;

FIGS. 6A and 6B are tables exemplifying data in the history management table stored in the history manager;

FIGS. 7A and 7B are views showing an example of a history information selection screen in reprinting and an example of a confirmation screen, respectively;

FIGS. 16A and 16B are tables exemplifying a history management table stored in a history manager;

FIG. 17 is a view exemplifying display of an obtained reprint target list; and

FIG. 18 is a view exemplifying a history information screen display for reprinting according to the second embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
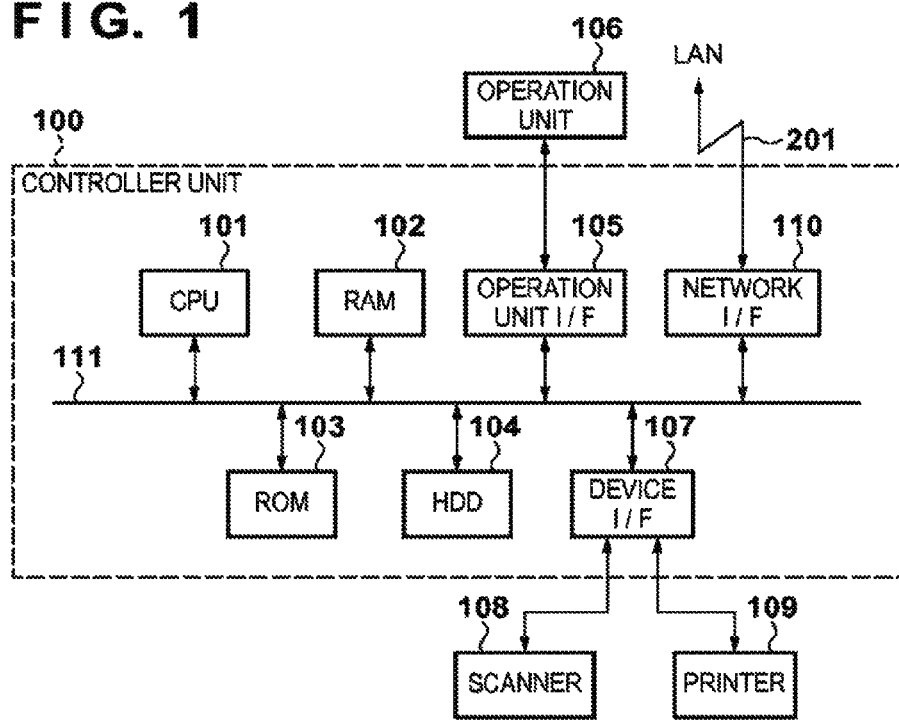
FIG. 1 is a block diagram for explaining the hardware arrangement of an image forming apparatus according to the first embodiment of the present invention.

FIG. 1 is a block diagram for explaining the hardware arrangement of an image forming apparatus according to the first embodiment of the present invention.

A controller unit 100 is a controller which controls the image forming apparatus. A CPU 101 is an arithmetic unit (microcomputer) for controlling the overall system. The CPU 101, a RAM 102, a ROM 103, a hard disk drive (HDD) 104, an operation unit interface (I/F) 105, a device I/F 107, and a network I/F 110 are connected to a system bus 111. The CPU 101 performs centralized control of the respective units connected to the system bus 111. The RAM 102 is a system work memory for operating the CPU 101, and is an image memory for temporarily storing image data. The RAM 102 also stores programs such as an operating system, system software, and application software. The ROM 103 stores the boot program of the system. The ROM 103 may store system programs, application programs, and information necessary for the image forming apparatus, such as a font. The HDD 104 stores an operating system, system software, application software, image data, and the like.

By executing a program stored in the RAM 102, the CPU 101 processes image data or another data stored in the RAM 102, ROM 103, or HDD 104. A compact image forming apparatus may not include the HDD 104, and may store system software, application software, and the like in the ROM 103. Instead of the HDD 104, the image forming apparatus may adopt a storage device such as a flash memory (for example, SSD (Solid State Disk)).

The operation unit I/F 105 is connected to an operation unit 106. The operation unit 106 includes a display unit such as a touch panel which notifies the user of the state of the image forming apparatus or receives an operation from the user, and an operation button for giving an instruction to the image forming apparatus. The device I/F 107 connects a scanner 108 and printer 109 each serving as an image input/output device to the controller unit 100, and receives and outputs image data. Image data input from the scanner 108 via the device I/F 107 is stored in the RAM 102 or HDD 104. If necessary, the stored image data undergoes image processing by an application program stored in the RAM 102. When printing image data, it is output to the printer 109 via the device I/F 107. The network I/F 110 is connected to a LAN 201, and receives and outputs image data in an external apparatus on a network or information for controlling the image forming apparatus.

Note that the arrangement is not limited to that of FIG. 1, and may be one not shown in FIG. 1 as long the advantages of the present invention are obtained. For example, for an image forming apparatus having a facsimile (FAX) function, the controller unit 100 may include an I/F for a modem (not shown) and be connected to a public line via the modem to allow FAX transmission. Alternatively, the controller unit 100 may include a USB I/F (not shown) so that data stored in a flash memory card or the like is read out and printed.

Figure 2:
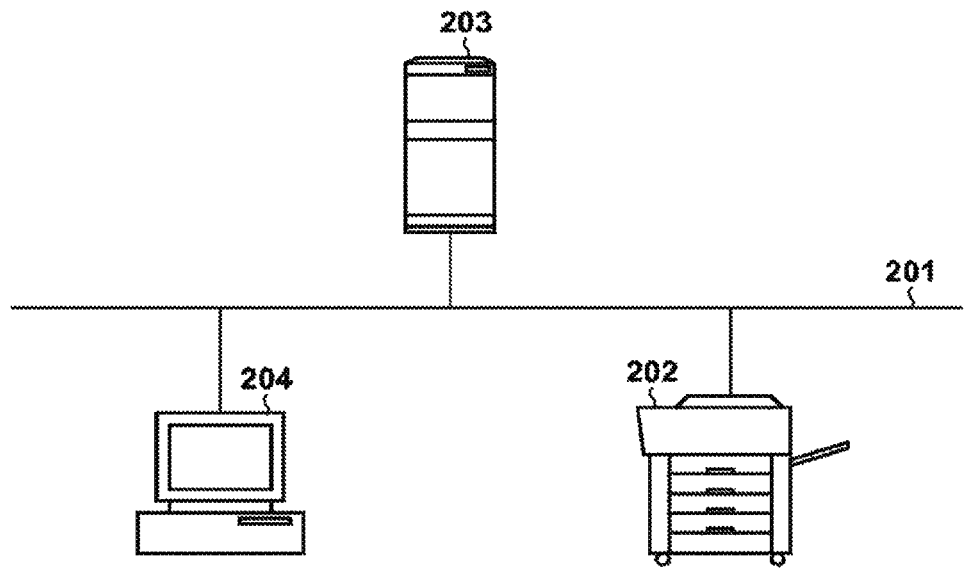
FIG. 2 is a view exemplifying a system arrangement according to the first embodiment of the present invention.

FIG. 2 is a view exemplifying a system arrangement according to the embodiment.

An image forming apparatus 202 having the hardware arrangement shown in FIG. 1, a file server (information processing apparatus) 203, and a client PC 204 are connected to the LAN 201. An apparatus connected to the LAN 201 can execute a file operation to the file server 203 using a file sharing protocol such as SMB (Server Message Block), CIFS (Common Internet File System), or WebDAV (Web-based Distributed Authoring and Versioning). The image forming apparatus 202 can also execute a file operation to the file server 203 connected to the LAN 201 using a file sharing protocol such as SMB, CIFS, or WebDAV. The file sharing protocol for file access is a well-known technique, and a detailed description thereof will be omitted.

By using the file sharing protocol, the image forming apparatus 202 can obtain the data contents and attribute information of a file stored in the file server 203. The file attribute information is information about the file name, creation date & time, update date & time, access date & time, file size, and access right. Note that the file attribute information is not limited to the above-described one, and may include information not included in these items. In the client PC 204, application software runs, and a printer driver or the like sends a print instruction from the application software to the image forming apparatus 202 via the LAN 201. In FIG. 2, one image forming apparatus 202, one file server 203, and one client PC 204 exist on the LAN 201. However, the number of image forming apparatuses, file servers, or client PCs is not limited to one, and a plurality of image forming apparatuses, file servers, or client PCs may exist.

User authentication in the image forming apparatus 202 will be explained. The image forming apparatus 202 restricts the use thereof so that only a specific user can use it, or permits an operation after user authentication in order to record a user operation. For example, information (user name and password) about authentication is held as a user database in the HDD 104 of the image forming apparatus 202. The image forming apparatus 202, before permitting the use thereof, displays an authentication screen on the operation unit 106 to prompt the user to enter a user name and password. Only when the user name and password coincide with those in the user database, the image forming apparatus 202 permits the user to operate it. Alternatively, the image forming apparatus 202 may belong to the domain of an authentication system such as Microsoft Active Directory. In this case, the image forming apparatus 202 does not include the user database and inquires, of an external authentication server on the network, whether user information entered by the user is authentic. The authentication technique in the image forming apparatus 202 is a well-known one and is not the gist of the present invention, and a description thereof will be omitted. In the embodiment, user authentication is performed. As another operation, all users may use the image forming apparatus 202 without user authentication.

Figure 3:
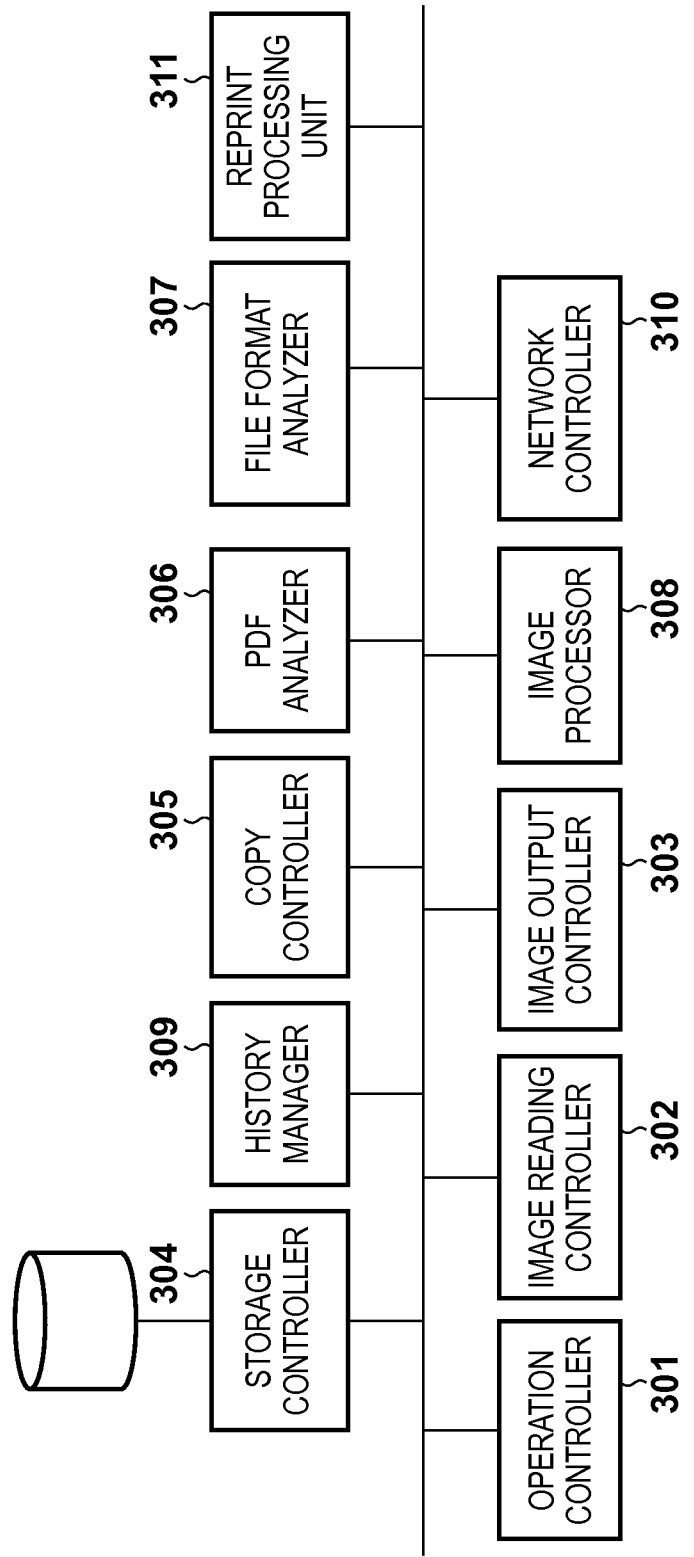
FIG. 3 is a functional block diagram showing the functional arrangement of the image forming apparatus according to the first embodiment of the present invention.

FIG. 3 is a functional block diagram showing the functional arrangement of the image forming apparatus according to the embodiment. The following description assumes that the CPU 101 executes programs which centralize respective processing units in FIG. 3 to control the image forming apparatus 202. FIG. 3 shows only components necessary to the description of the embodiment. Needless to say, another component of the image forming apparatus for FAX processing or the like may exist.

First, copy processing will be explained. Although not shown, the scanner 108 includes a pressing plate and sheet document reader (automatic document feeder (ADF)). When the user sets an original on the pressing plate or ADF and presses a start button (not shown) on the operation unit 106, the scanner 108 optically reads the original set on the pressing plate or ADF. When reading an original of a plurality of pages, the original sheets are replaced on the pressing plate and read, or the original sheets set on the ADF are sequentially read. At this time, the user can designate, on the operation unit 106, print settings regarding output such as imposition on the sheet, finisher setting such as stapling, and image quality setting such as density.

An operation controller 301 displays a screen and information necessary for an operation on the operation unit 106, receives information about an operation on the operation unit 106 by the user, and determines the designated operation. When the user requests copying, the operation controller 301 generates a screen necessary for copying, and instructs the operation unit 106 to display it. Since the operation unit 106 displays the screen for copying, the user sets an original on the pressing plate or ADF, and designates copying. At this time, the user may designate the above-mentioned print settings. Then, the copy instruction is transferred from the operation unit 106 to the operation controller 301. Because of the copy instruction, the operation controller 301 shifts control to a copy controller 305.

Since an original needs to be read first, the copy controller 305 instructs an image reading controller 302 to read the original. The image reading controller 302 controls the scanner 108 via the device I/F 107 to read the original on the pressing plate or ADF. When replacing original sheets on the pressing plate, the copy controller 305 returns control to the operation controller 301. The operation controller 301 displays again, on the operation unit 106, a selection screen for prompting the user to select reading of the next original sheet or the start of printing.

The data obtained by reading is stored in a storage controller 304 via the device I/F 107 and system bus 111. In practice, the storage controller 304 stores the data in the RAM 102 or HDD 104. Which of the RAM 102 and HDD 104 stores data is determined by the image reading controller 302 in accordance with a factor such as the data size or whether quick processing is required.

Since the read data needs to be printed, the copy controller 305 instructs an image output controller 303 to print the read image data stored in the storage controller 304. The image output controller 303 instructs an image processor 308 to perform image processing for the image data stored in the storage controller 304 at print settings designated by the user. Image processing is editing of an image such as imposition of two original sheets on one sheet (2in1). After the image processor 308 completes image editing for printing, the image output controller 303 reads out the result of image processing from the storage controller 304, and transmits it to the printer 109 via the system bus 111 and device I/F 107. The printer 109 sequentially prints images on sheets based on the transmitted data.

The printed data is recorded in a history manager 309 together with the printing date & time, the name of a user who designated printing, print settings, and image data which was read by the scanner 108 and is stored in the storage controller 304. As the image data stored at this time, data before image processing by the image processor 308 is recorded. Since the print settings upon printing are also recorded, the print settings upon execution of copying can be restored to copy again based on image data read from the original.

A case in which an apparatus such as an external PC connected to the LAN 201 generates page description language (PDL) data using a printer driver from application software, and the generated data is transmitted to the image forming apparatus 202 and printed by it will be explained. PDL data complies with LIPS®, Adobe PostScript, or the like. The image forming apparatus 202 interprets PDL data and prints. Note that the CPU 101 may interpret PDL data using a program stored in the ROM 103 or HDD 104. Alternatively, hardware for a dedicated PDL interpreter may be prepared and used to interrupt PDL data. The printer driver and PDL interpretation are not the gist of the present invention, and a detailed description thereof will be omitted.

The client PC 204 transmits, to the image forming apparatus 202 via the LAN 201, PDL data generated by a printer driver or the like, and print settings for the PDL data. In the embodiment, PDL data and print settings are transmitted separately. However, print settings may be contained in PDL data and extracted by a PDF analyzer 306 (to be described later).

In the image forming apparatus 202, a network controller 310 receives the transmitted PDL data via the network I/F 110 connected to the LAN 201. The network controller 310 requests the storage controller 304 to store the received PDL data. Then, the PDL data is stored in the RAM 102 or HDD 104 via the system bus 111. After storing the PDL data, control shifts to the PDF analyzer 306.

The PDF analyzer 306 interprets the stored PDL data, and converts it into data of a format printable by the image forming apparatus 202. The storage controller 304 stores the converted data in the RAM 102 or HDD 104. To output the received PDL data, the PDF analyzer 306 instructs the image output controller 303 to print the image data which has been converted into the format printable by the image forming apparatus 202 and is stored in the storage controller 304. The image output controller 303 instructs the image processor 308 to perform image processing for data stored in the storage controller 304 in accordance with the print settings transferred from the client PC 204 together with the PDL data. Image processing is the same as that described in copying.

After the image processor 308 completes image editing for printing, the image output controller 303 reads out the result of image processing from the storage controller 304, and transmits it to the printer 109 via the system bus 111 and device I/F 107. The printer 109 sequentially prints images on sheets based on the transmitted data.

The history manager 309 records the printed data together with the execution history including the printing date & time when PDL printing was executed, the name of a user who designated printing, device information of the transmission source, and PDL data. The history manager 309 also records the print settings upon printing. Further, the history manager 309 records image data which has been converted into a format printable by the image forming apparatus 202 and is stored in the storage controller 304. The image data stored at this time is image data before processing by the image processor 308 so that print settings upon PDL printing can be restored based on the print settings upon printing that are recorded together with PDL data, and printing can be executed using image data which remains unchanged from one received from an external PC or the like.

A method (file direct print) in which data of an image data format such as TIFF or JPEG or a document format such as Adobe PDF is directly transmitted from the client PC 204 to the image forming apparatus 202 to execute printing by the image forming apparatus 202 will be explained. The CPU 101 may interpret image data or document data using a program stored in the ROM 103 or HDD 104. Alternatively, dedicated hardware may be prepared and used to interrupt image data or document data. The client PC 204 transmits, to the image forming apparatus 202 via the LAN 201, image data or document data interpretable by the image forming apparatus 202, and print settings. For example, the client PC 204 accesses the Web server of the image forming apparatus 202 using the Web browser, and transmits the image data or document data and the print settings in the client PC 204 to the image forming apparatus 202.

In the image forming apparatus 202, the network controller 310 receives the image data or document data and the print settings transmitted via the network I/F 110 connected to the LAN 201. The network controller 310 requests the storage controller 304 to store the received image data or document data and the received print settings. Then, the PDL data is stored in the RAM 102 or HDD 104 via the system bus 111. After storing the image data or document data and the print settings, control shifts to a file format analyzer 307.

The file format analyzer 307 interprets the stored image data or document data, and converts it into a data format printable by the image forming apparatus 202. The storage controller 304 stores the converted data in the RAM 102 or HDD 104. To output the received data, the file format analyzer 307 instructs the image output controller 303 to print the image data which has been converted into the format printable by the image forming apparatus 202 and is stored in the storage controller 304. The image output controller 303 instructs the image processor 308 to perform image processing for the data stored in the storage controller 304 in accordance with the print settings transferred from the client PC 204. Image processing is the same as that described in copying. After the image processor 308 completes image editing for printing, the image output controller 303 reads out the result of image processing from the storage controller 304, and transmits it to the printer 109 via the system bus 111 and device I/F 107. The printer 109 sequentially prints images on sheets based on the transmitted data.

The history manager 309 records the printed data together with the printing date & time when file direct printing was executed, the name of a user who designated printing, device information of the transmission source, and data. The history manager 309 also records the print settings upon output. Further, the history manager 309 records the image data which has been converted into a format printable by the image forming apparatus 202 and is stored in the storage controller 304. The image data stored at this time is image data before processing by the image processor 308 so that the print settings upon file direct printing can be restored based on the print settings upon output that have been transmitted together with data, and printing can be performed using image data which remains unchanged from one received from the client PC 204.

A case in which image data or document data in an apparatus such as a network-connected file server or the like is obtained and printed will be explained. In this case, image data or document data is data of a format such as TIFF, JPEG, or PDF. As described above, the image forming apparatus 202 interprets and prints data of a format such as TIFF, JPEG, or PDF. The file server 203 adopts a protocol for sharing a file on a network, such as SMB, CIFS, or WebDAV. Note that the CPU 101 may interpret image data or document data using a program stored in the ROM 103 or HDD 104. Alternatively, dedicated hardware may be prepared and used to interrupt image data or document data. The file sharing protocol used between the file server and the image forming apparatus 202 may be a protocol other than SMB, CIFS, or WebDAV. Interpretation of image data or document data, and the file sharing protocol are not the gist of the present invention, and a detailed description thereof will be omitted.

When the user designates, on the operation unit 106, the connection protocol (for example, CIFS or WebDAV), IP address, host name, and path of a file server at a connection destination, the image forming apparatus 202 is connected to (accesses) the file server 203 in accordance with the designation. In access, the file server 203 may require authentication. In this case, the image forming apparatus 202 displays an authentication screen corresponding to the file server 203 on the operation unit 106, prompts the user to enter necessary information (for example, user name and password), and inquires authentication of the file server based on the input information.

To execute reprinting (to be described later), the image forming apparatus 202 may record user information as history information. If user authentication has been performed for the image forming apparatus 202, the image forming apparatus 202 may try to access the file server 203 using the user information. If the image forming apparatus 202 belongs to the domain of the authentication system, the image forming apparatus 202 may access the file server without authentication again by using a technique such as Kerberos.

Another example is an authentication method in which, when authentication is executed using the user database of the image forming apparatus 202, user information in the image forming apparatus 202 and user information in the file server 203 are stored in advance in association with each other. In this case, when the image forming apparatus 202 accesses the file server 203 based on user information used for authentication in the use of the image forming apparatus 202, associated user information in the file server 203 can be obtained. By using the obtained user information, the image forming apparatus 202 can access the file server 203 without displaying an authentication screen for the user. The above-described methods are merely examples, and authentication for the file server may be achieved by another method.

By using the operation unit 106, the user selects a data file stored in the file server 203 and issues a print instruction. This data file is image data or document data interpretable by the image forming apparatus 202. When issuing a print instruction for the data file, the user can designate, on the operation unit 106, print settings regarding output such as imposition. The image data or document data, printing of which is designated by the user, is transmitted from the file server 203 to the image forming apparatus 202 via the LAN 201. In the image forming apparatus 202, the network controller 310 receives the image data or document data transmitted via the network I/F 110 connected to the LAN 201. At this time, the image forming apparatus 202 obtains, from the file server 203, attribute information (for example, update date & time, file size, and owner) of the designated image data or document data. The network controller 310 requests the storage controller 304 to store the received image data or document data and its attribute information. Then, these data are stored in the RAM 102 or HDD 104 via the system bus 111.

After storing the image data or document data, control shifts to the file format analyzer 307. The file format analyzer 307 interprets the stored image data or document data, and converts it into data of a format printable by the image forming apparatus 202. The storage controller 304 stores the converted data in the RAM 102 or HDD 104. To output the received image data or document data, the file format analyzer 307 instructs the image output controller 303 to print the image data which has been converted into the format printable by the image forming apparatus 202 and is stored in the storage controller 304. The image output controller 303 instructs the image processor 308 to perform image processing for data stored in the storage controller 304 in accordance with the print settings designated by the user. Image processing is the same as that described in copying.

After the image processor 308 completes image editing for printing, the image output controller 303 reads out the result of image processing from the storage controller 304, and transmits it to the printer 109 via the system bus 111 and device I/F 107. The printer 109 sequentially prints images on sheets based on the received data.

The history manager 309 records the printed data together with the attribute information and print settings upon output, including the date & time when the file on the network was printed, the name of a user who performed printing, the URI of the data obtaining source, the update date & time, and the file size. The image data stored at this time is image data before processing by the image processor 308. When the image forming apparatus 202 prints data obtained from the file server 203, data converted into the format printable by the image forming apparatus 202 need not be stored, unlike the above-mentioned copying and PDL data printing. This is because printable data is large in size and cannot be saved when the capacity of the HDD 104 is small or the image forming apparatus 202 is a compact image forming apparatus having no HDD. In this case, not printable data but the path (URL) of the file server 203 is saved, thereby saving the storage capacity in the image forming apparatus. If possible, image data which has been converted into a format printable by the image forming apparatus 202 and is stored in the storage controller 304 may be saved together with the path (URL) of the file server 203.

Processing of obtaining and printing image data or document data held in an apparatus such as the file server 203 connected to the LAN 201 will be described with reference to the flowchart of FIG. 4. Note that a program which executes the sequence of this flowchart is stored in the RAM 102 in execution, and executed under the control of the CPU 101. This also applies to the remaining flowcharts according to the remaining embodiments to be described later.

Figure 4:
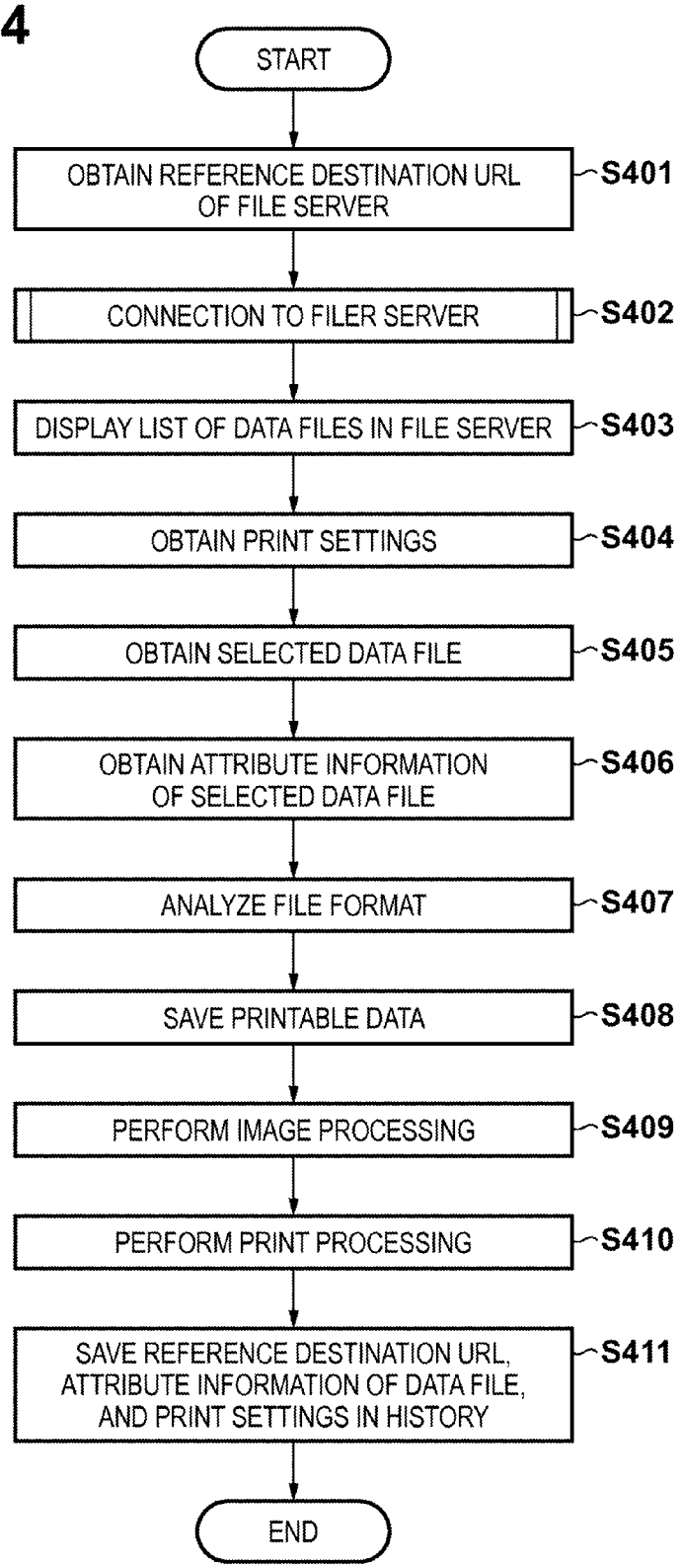
FIG. 4 is a flowchart for explaining processing of printing image data from a file server by the image forming apparatus according to the first embodiment of the present invention.

FIG. 4 is a flowchart for explaining processing of printing image data from the file server 203 by the image forming apparatus according to the embodiment. Note that a program which executes this processing is loaded into the RAM 102 in execution, and executed under the control of the CPU 101.

Although not shown, assume that the user designates, on the operation unit 106, the connection protocol (for example, CIFS or WebDAV), IP address, host name, and path (URL) of a file server at a connection destination, and designates printing of a data file in the file server.

In step S401, the operation controller 301 obtains the reference destination URL of the file server that has been designated by the user using the operation unit 106. In step S402, the network controller 310 is connected to a file server indicated by the reference destination URL received in step S401. Although not shown, if necessary, authentication request processing or the like is performed for the file server in step S402, as described above. The process advances to step S403, and the network controller 310 obtains a list of data files present at the reference destination URL of the file server connected in step S402, and displays it on the operation unit 106. The user selects a data file to be printed from the data list displayed on the operation unit 106 in step S403, and instructs the image forming apparatus 202 to execute printing. The process then advances to step S404, and the operation controller 301 obtains print settings made by the user. The process advances to step S405, and the network controller 310 obtains the contents of the data file selected by the user. The process advances to step S406, and the network controller 310 obtains attribute information of the data file selected by the user.

The process advances to step S407, and the file format analyzer 307 analyzes the contents of the data file obtained in step S405, and converts it into data of a format printable by the image forming apparatus 202. The process advances to step S408, and the file format analyzer 307 saves the data of the format printable by the image forming apparatus 202 that has been converted in step S407. After that, the process advances to step S409, and the image processor 308 performs, in accordance with the print settings obtained in step S404, image processing for the data of the format printable by the image forming apparatus 202 that has been saved in step S408. The process advances to step S410, and the image output controller 303 prints the data having undergone image processing in step S408. The process then advances to step S411, and the history manager 309 saves, as history information, the reference destination URL of the data file selected in step S405, the print settings obtained in step S404, and the attribute information of the data file obtained in step S406. Note that the attribute information of the data file is information about a file including the file name, creation date & time, update date & time, access date & time, file size, and access right.

This flowchart has described an example in which a data file in the file server 203 is printed, but is also applicable to printing by copying, PDL data printing, or file direct printing described above. For example, in printing by copying, reading processing by the scanner 108 replaces the processes in steps S401 to S403. In this case, neither data nor its attribute information need be obtained from the server, and the processes in steps S405 to S407 can be skipped. In step S411, image data read by the scanner 108 and print settings made by the user are saved as history information.

In PDL printing, PDL data reception processing from the LAN 201 replaces the processes in steps S401 to S403. In this case, neither data nor its attribute information need be obtained from the file server 203, and the processes in steps S405 and S406 can be skipped. In step S407, PDL data analysis processing is performed. In step S411, data of a format printable by the image forming apparatus 202 that is generated by analyzing PDL data, and print settings made by the user are saved as history information. File direct printing is the same processing as PDL data printing, and file format analysis processing is performed in step S407.

FIGS. 5A and 5B are tables exemplifying a history management table stored in the history manager 309.

FIG. 5A exemplifies an attribute information table managed commonly to respective jobs in the image forming apparatus 202. FIG. 5B exemplifies an additional history information table for a job using a file in the file server 203 on the network.

The management table in FIG. 5A has the items of a job type 501, date & time 502, user ID 503, print setting save destination 504, print image data save destination 505, and external file attribute ID 506. Note that the history management table described in the embodiment is merely an example, and may contain items other than those in FIGS. 5A and 5B.

The job type 501 records the type of job. For example, for copying, "COPY" representing copying is recorded. A job type "PDL" is recorded for PDL printing, a job type "FILE" is recorded for file direct printing, and a job type "NET" is recorded for printing of a file on a network. Although the embodiment describes these job types, a job of another type processible by the image forming apparatus 202 may be handled to record this job type in the history manager 309. For example, when a document received by FAX is printed, "FAX" may be recorded in the job type 501. In addition, when scanned image data is sent by mail using a file transmission function, "SEND" may be recorded in the job type 501. For the aforementioned file direct printing, "DIRECT" may be recorded.

The date & time 502 records the date & time when a job of a given job type was executed. The user ID 503 records the ID of a user who instructed execution of a job of the job type. As the user ID, the user name is recorded in the embodiment. However, an internal management ID such as a unique numerical value corresponding to the user name may be recorded. The print setting save destination 504 indicates the save destination of a file in which settings upon printing are saved. The print image data save destination 505 records the storage destination of image data to be printed by the image forming apparatus 202.

In the example of FIG. 5A, only file names are described in the print setting save destination 504 and print image data save destination 505. However, a full path or a path relative to a predetermined path may be recorded.

The external file attribute ID 506 records an ID for looking up a table which records various attributes of a designated file when image data or document data held in an apparatus such as a file server connected to the LAN 201 is printed. In FIG. 5A, the external file attribute ID 506 is blank ("-") except for "NET" because the file server is not accessed. The job attribute "NET" represents printing of a file from the file server 203, so the external file attribute ID 506 is recorded. In FIG. 5A, "28" is recorded as the external file attribute ID 506, and corresponds to "28" in an ID field 507 in the table of FIG. 5B. More specifically, the external file attribute ID 506 for the job type "NET" in FIG. 5A is associated with information in each field corresponding to the ID 507 "28" in FIG. 5B.

The table in FIG. 5B contains the ID 507, a reference destination URL 508, a protocol 509, an update date & time 510, a file size 511, and a file owner 512. As described above, the ID 507 is a field referred to from the external file attribute ID 506 in FIG. 5A. The reference destination URL 508 records a URL indicating the location of image data or document data in the file server 203 designated in printing. The protocol 509 records a protocol used to access the file server 203. The update date & time 510, file size 511, and file owner 512 record the update date & time, file size, and owner of image data or document data in the file server 203 that was designated in printing, respectively. In the example of FIG. 5B, history information is recorded for only the file attribute of the file server 203. However, user information or the like used to access the file server 203 may also be recorded. In the embodiment, two management tables are separated as shown in FIGS. 5A and 5B. However, these two management tables may be integrated and managed as one management table.

A reprinting method based on history information will be explained. First, history information stored in the history manager 309 will be described by exemplifying FIGS. 6A and 6B. FIGS. 6A and 6B are tables exemplifying data in the history management table stored in the history manager 309. The history management table contains pieces of history information 601 to 606.

As described above, the history manager 309 receives history information from each processing module, and records it in a table managed by the history manager 309. In the embodiment, only a history regarding printing is described for simplicity. However, history information about another operation (for example, FAX or image mail transmission) to the image forming apparatus may be recorded and managed.

The history manager 309 accepts a history information list obtaining request from another processing unit. At this time, all pieces of history information managed by the history manager 309 can be sent back as a history information list. It is also possible to designate a condition to each item of the table, extract only necessary history information, and send back a history information list to another processing unit. For example, when the history manager 309 has the history management tables shown in FIGS. 6A and 6B, if the history manager 309 is instructed to send back only history information corresponding to the job type "COPY", the history manager 309 sends back only the pieces of history information 601 and 605 as a history information list to the requesting source. When a request to send back only history information corresponding to a user "suzuki" is sent to the history manager 309, the history manager 309 sends back only the history information 602 as a history information list. Not only one but a plurality of conditions may be designated. For example, as for the job type, the history manager 309 may be requested to send back history information corresponding to the job types "PDL" and "NET". In this case, the history manager 309 sends back the pieces of history information 602, 603, and 604.

A range can be designated for the printing date & time or the like. In the example of FIGS. 6A and 6B, when history information corresponding to a printing date & time "from 2011.1.5 to 2011.1.31" is requested of the history manager 309, the history manager 309 sends back the pieces of history information 603 and 604 as a history information list to the requesting source. Further, the OR or AND of a plurality of items may be set as a condition to request history information of the history manager 309.

The AND condition for a plurality of items will be exemplified. When history information corresponding to the job type "COPY" or "NET" and a user "yamada" is requested of the history manager 309, the history manager 309 sends back the pieces of history information 601, 603, and 605 as a history information list to the requesting source. The condition may contain range designation such as the date & time. Assume that history information corresponding to the job type "COPY" or "NET", the user "yamada", and the printing date & time "from 2011.1.5 to 2011.2.1" is requested of the history manager 309. In this case, the history manager 309 sends back the pieces of history information 603 and 605 as a history information list to the requesting source. That is, the history manager 309 sends back only necessary history information as a history information list to the requesting source in accordance with a history information filtering condition designated by each processing unit.

A reprint processing unit 311 controls reprint processing. When the user designates the start of reprint processing via the operation unit 106, display of history information subjected to reprinting is requested of the reprint processing unit 311. In this case, the reprint processing unit 311 requests a history information list of the history manager 309. At this time, the history manager 309 is instructed to obtain only history information of a user who currently operates the image forming apparatus 202. This is because, if reprinting is possible based on history information of an operation by another user, the other user can print a document which can be printed by only a user described in the history. This is merely an example, and this restriction is unnecessary if the image forming apparatus 202 is used in an environment where printing is permitted for all users.

Assume that the user "yamada" operates the image forming apparatus 202 now. As described above, the reprint processing unit 311 requests only history information of a specific user of the history manager 309. The history manager 309 extracts only history information of the designated user from the history management table, and sends back the history information list to the reprint processing unit 311. In the example of FIGS. 6A and 6B, the history manager 309 sends back the pieces of history information 601, 603, and 605 corresponding to the user "yamada" to the reprint processing unit 311. Although not described for simplicity, when the history management table records history information corresponding to a job type other than printing ("COPY"), the reprint processing unit 311 may request a history information list of the history manager 309 using only the job type regarding printing as a condition. The reprint processing unit 311 shapes the history information list received from the history manager 309 to match screen display, and instructs the operation unit 106 to display history information. At this time, history information selected on the operation unit 106 and history information described in the history information list are associated with each other.

FIG. 7A is a view exemplifying a history information selection screen in reprinting.

As represented by pieces of history information 701, 702, and 703, information about the job type, printing date & time, and reference destination URL (for only the history information 702) is displayed as history information. The user selects history information subjected to reprinting from the screen, and presses a reprint button 704. Note that the screen of FIG. 7A may contain a cancel button to stop reprinting, and a page feed button used when pieces of history information exist and do not fit in one screen.

The operation unit 106 transfers information about the history information selected by the user to the reprint processing unit 311. Based on the information obtained from the operation unit 106, the reprint processing unit 311 identifies the history information selected by the user from the history information list obtained in advance from the history manager 309. Then, the reprint processing unit 311 confirms whether the selected history information records the print setting save destination 504. If the print setting save destination 504 is not recorded, a print setting screen (not shown) is displayed. In the print setting screen, the user makes settings about printing including imposition on an output sheet, finisher setting such as stapling, and density setting, but a description thereof will be omitted. After the user makes appropriate print settings and designates printing, the reprint processing unit 311 identifies a print image data save destination from the print image data save destination 505 of the selected history information, and obtains the data from the storage controller 304. The reprint processing unit 311 transfers the data and the print settings made by the user to the image output controller 303, and instructs the image output controller 303 to execute printing.

The image output controller 303 instructs the image processor 308 to perform image processing for the identified data stored in the storage controller 304. Similar to copying described above, the image processor 308 executes image editing for output in accordance with the print settings made by the user, and returns control to the image output controller 303. The image output controller 303 reads out the result of image processing from the storage controller 304, and outputs it to the printer 109 via the system bus 111 and device I/F 107. The printer 109 executes reprinting by sequentially printing the transmitted data on sheets.

When the selected history information records the print setting save destination 504, the operation unit 106 displays a confirmation screen as shown in FIG. 7B. FIG. 7B shows a screen for inquiring whether to execute reprinting based on the same settings when print settings used in previous printing are saved. If the user selects a "Yes" button in FIG. 7B, the reprint processing unit 311 obtains print image data and print settings from the storage controller 304 based on the print image data save destination 505 and print setting save destination 504 in the history information. Then, the reprint processing unit 311 transfers the obtained data and print settings to the image output controller 303, and instructs the image output controller 303 to execute printing. If the user selects a "No" button in FIG. 7B, the same processing as that when the selected history information does not record the print setting save destination 504 is performed. At this time, the print settings of the selected history information may be reflected and displayed on the print setting screen.

Figure 8:
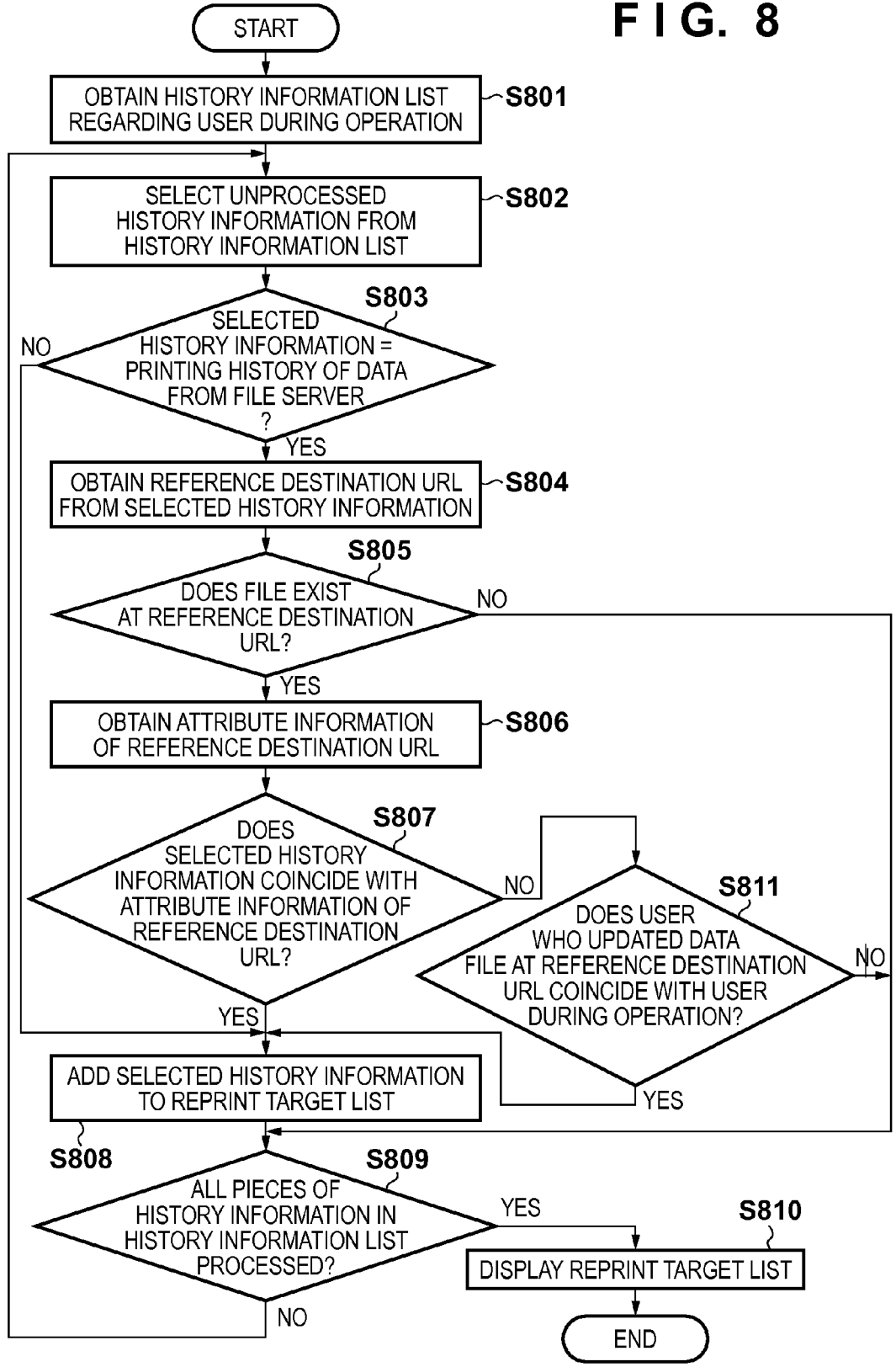
FIG. 8 is a flowchart for explaining processing of displaying a reprint target list by the image forming apparatus according to the first embodiment of the present invention.

FIG. 8 is a flowchart for explaining processing of displaying a reprint target list by the image forming apparatus 202 according to the first embodiment. Note that a program which executes this processing is loaded into the RAM 102 in execution, and executed under the control of the CPU 101.

This processing starts when the user requests, via the operation unit 106, display of history information for reprinting. In this flowchart, when a data file in the file server has been updated, and a user who updated the data file is the same as one who designates reprinting, the data file is reprinted. More specifically, a user who designates reprinting designates reprinting from history information designated for printing by him. Even when data in the file server has been updated, if the user who designates reprinting of the data updated the data, the user is highly likely to recognize that the data has been updated. Therefore, when the user who designates reprinting updated the data file in the file server that is described in the history information, the data file is added to reprint targets.

In step S801, the reprint processing unit 311 requests, of the history manager 309, a history information list about history information of a user who currently operates the image forming apparatus 202. The reprint processing unit 311 obtains, as a history information list from all pieces of history information managed by the history manager 309, only pieces of history information of the user during operation. Obtainment of the history information list has been described above. The process advances to step S802, and the reprint processing unit 311 selects unprocessed history information from the history information list obtained in step S801. The history information selected in step S802 is handled as processed history information in the history information list in subsequent processing of this flowchart.

The process advances to step S803, and the reprint processing unit 311 determines whether the history information selected in step S802 represents that a data file in the file server has been printed. More specifically, the reprint processing unit 311 checks the job type field of the history information, determines whether the job type is "NET", and if so, determines that the data file in the file server has been printed. If the reprint processing unit 311 determines in step S803 that the history information represents that the data file in the file server has been printed, the process advances to step S804. If the reprint processing unit 311 determines in step S803 that the history information does not represent that the data file in the file server has been printed, the process advances to step S808 to set the data file as a reprint target.

In step S804, the reprint processing unit 311 obtains a reference destination URL from the history information selected in step S802. The process then advances to step S805, and the reprint processing unit 311 accesses a file server indicated by the reference destination URL obtained in step S804, and determines whether the data file exists. More specifically, the reprint processing unit 311 requests the network controller 310 to access the file server described in the reference destination URL, and determines whether the data file exists.

If the reprint processing unit 311 determines in step S805 that the data file does not exist in the file server indicated by the reference destination URL, the process advances to step S809. Since the data file received in advance from the file server has already been deleted from the file server, the data file is not added to reprint targets. If the reprint processing unit 311 determines in step S805 that the data file exists in the file server indicated by the reference destination URL, the process advances to step S806, and the reprint processing unit 311 obtains attribute information of the data file indicated by the reference destination URL obtained in step S802. More specifically, the reprint processing unit 311 requests the network controller 310 to access the file server described in the reference destination URL and obtain attribute information of the data file. Thereafter, the process advances to step S807, and the reprint processing unit 311 determines whether the attribute information of the data file in the file server that has been obtained in step S806 coincides with attribute information recorded in the history information selected in step S802. For example, the reprint processing unit 311 determines whether pieces of information about the update date & time or file size coincide with each other. Comparison of the update date & time or file size is merely an example, and pieces of information of another type may be compared to determine whether pieces of attribute information coincide with each other.

If the reprint processing unit 311 determines in step S807 that the pieces of attribute information do not coincide with each other, the process advances to step S811. If the reprint processing unit 311 determines in step S807 that the pieces of attribute information coincide with each other, the process advances to step S808. In step S811, the reprint processing unit 311 determines whether information of the user who updated the data file, which is contained in the attribute information of the data file in the file server that has been obtained in step S806, coincides with user information contained in attribute information recorded in the history information selected in step S802. This can be determined based on, for example, whether pieces of file owner information coincide with each other in a system in which the owner of a file upon update changes to a user who updated the file. Comparison of the file owner is merely an example, and update user information may be determined based on whether pieces of information of another type coincide with each other. If the reprint processing unit 311 determines in step S811 that the update users coincide with each other, the process advances to step S808, and the history information is added as a reprint target. If the reprint processing unit 311 determines in step S811 that the update users do not coincide with each other, the process advances to step S809, and the history information is not added as a reprint target.

When displaying a reprint target list in step S810 (to be described later), the display of a file updated by the user himself may be changed to clarify that he updated the file. For example, a target print job may be displayed in distinction from another print job by changing the color of updated history information, or displaying a character or icon representing that a file has been updated.

In step S808, the reprint processing unit 311 adds the history information selected in step S802 to the reprint target list. More specifically, if the pieces of attribute information coincide with each other in step S807, the data file exists in the file server and has not been updated, and thus the same data file as that printed before can be output. Thus, the reprint processing unit 311 sets the history information selected in step S802 as a reprint target. If the reprint processing unit 311 determines in step S811 that the update user coincides with one who currently operates the image forming apparatus, the data file in the file server has been changed, but the user himself updated it, so the history information selected in step S802 is set as a reprint target. Note that the reprint target list is a collection of pieces of history information subjected to reprinting. In step S809, the reprint processing unit 311 determines whether all pieces of history information in the history information list obtained in step S801 have been processed.

If the reprint processing unit 311 determines in step S809 that not all pieces of history information have been processed, the process returns to step S802 to process unprocessed history information. If the reprint processing unit 311 determines in step S809 that all pieces of history information have been processed, the process advances to step S810. In step S810, the reprint processing unit 311 displays pieces of history information contained in the reprint target list on the operation unit 106. FIG. 7A exemplifies a list display in step S810.

If the reprint processing unit 311 determines in step S807 that the pieces of attribute information do not coincide with each other, the process may advance to step S809 without determination in step S811. In this case, only data files in the file server that have not been updated can be set as reprint targets.

This will be exemplified in more detail. Assume that the user "yamada" operates the image forming apparatus 202, and requests reprinting. The reprint processing unit 311 requests only history information of the user "yamada" of the history manager 309. Also, assume that a history information list obtained by extracting only pieces of history information of the user "yamada" is as shown in FIGS. 16A and 16B. The reprint processing unit 311 sequentially searches the history information list in FIG. 16A.

First, the reprint processing unit 311 checks history information 1601. Since the job type of the history information 1601 is "COPY", the reprint processing unit 311 adds the history information to the reprint target list.

Since the job type of history information 1602 is "NET", the reprint processing unit 311 checks the table in FIG. 16B for history information corresponding to an external file attribute ID "49". Since the ID "49" corresponds to history information 1607, the reprint processing unit 311 obtains the reference destination URL and protocol of the history information, accesses a file server indicated by the reference destination URL using the obtained protocol, and checks whether data exists. In this example, corresponding data files exist in the file server for all the history information 1602, history information 1604, and history information 1606, as assumed above. If the data file exists, the reprint processing unit 311 obtains attribute information of the reference destination URL from the file server.

Assume that the update date & time of a data file in the file server is "2010.9.8 09:51:03" and the file size is "30291 bytes". The obtained pieces of attribute information of the data file in the file server coincide with the update date & time and file size contained in the history information 1607. Thus, the reprint processing unit 311 adds the pieces of history information 1602 and 1607 to the reprint target list.

After that, the reprint processing unit 311 checks history information 1603. Since the job type is "PDL", the reprint processing unit 311 adds the history information to the reprint target list.

The reprint processing unit 311 checks the history information 1604, similar to the history information 1602. Also in this case, the data file exists, so the reprint processing unit 311 obtains attribute information of the reference destination URL of the history information 1604 from the file server. Assume that the update date & time of the data file in the file server is "2011.2.26 12:08:41" and the file size is "8372 bytes". The obtained pieces of attribute information of the data file in the file server do not coincide with the update date & time item and file size item contained in history information 1608. The reprint processing unit 311 checks the name of a user who updated the data file in the file server. This example assumes that "yamada" updated the data file in the file serve. A user who is to execute reprinting is also "yamada", and these user names coincide with each other. Hence, the reprint processing unit 311 adds a mark to represent that the data file has been updated, and adds the history information to the reprint target list.

The reprint processing unit 311 then checks history information 1605. Since the job type is "COPY", the reprint processing unit 311 adds the history information to the reprint target list.

Finally, the reprint processing unit 311 checks the history information 1606, similar to the history information 1602. Since the data file exists, as assumed above, the reprint processing unit 311 obtains attribute information of the reference destination URL of the history information 1606 from the file server. Assume that the update date & time of the data file in the file server is "2011.3.14 16:11:37" and the file size is "4085 bytes". In this case, the obtained pieces of attribute information of the data file in the file server do not coincide with the update date & time item and file size item contained in history information 1609. Hence, the reprint processing unit 311 checks the name of a user who updated the data file in the file server. This example assumes that "tanaka" updated the data file in the file serve. A user who is to execute reprinting is "yamada", and these user names do not coincide with each other. Thus, the reprint processing unit 311 does not add the history information to the reprint target list. As a result, the pieces of history information 1601, 1602, 1603, 1604, and 1605 remain in the reprint target list and are to undergo reprinting.

FIG. 17 is a view exemplifying display of the thus-obtained reprint target list.

In FIG. 17, a list of history information of a job type other than "NET", history information of the job type "NET" corresponding to a data file which has not been updated in the file server, and history information corresponding to a data file updated by a user who currently executes the reprint operation are displayed. In FIG. 17, an item corresponding to the history information 1604 of a data file updated in the file server is displayed together with an icon 1701 representing that the data file has been updated.

In the embodiment, history information is recorded as the user ID. However, when a user group is managed as the authentication method, group information may be recorded in the history information, and the embodiment may be applied to the group.

According to the first embodiment, data updated in a file server by a user himself who is to execute reprinting is added to reprint targets. Only a document recognized by the user to have been changed by him can be reprinted even if it has been updated. According to the first embodiment, when a user who designates reprinting expects to obtain the same result as a result obtained by previous printing, data updated in the file server is excluded from reprint targets, thereby preventing generation of a printing result the user does not want in reprinting.

Second Embodiment

The second embodiment in which, even if a data file in a file server has been updated, the data file is added to reprint targets, but a preview is displayed before reprinting to confirm whether to execute reprinting will be described. A description of the same parts as those in the first embodiment will not be repeated. Note that the system arrangement and the arrangement of an image forming apparatus 202 according to the second embodiment are the same as those in the first embodiment.

The second embodiment will be explained with reference to the flowcharts of FIGS. 9 and 10. In FIG. 10, the same reference numerals as those in the flowchart of FIG. 8 denote the same processes, and a description thereof will not be repeated.

Figure 9:
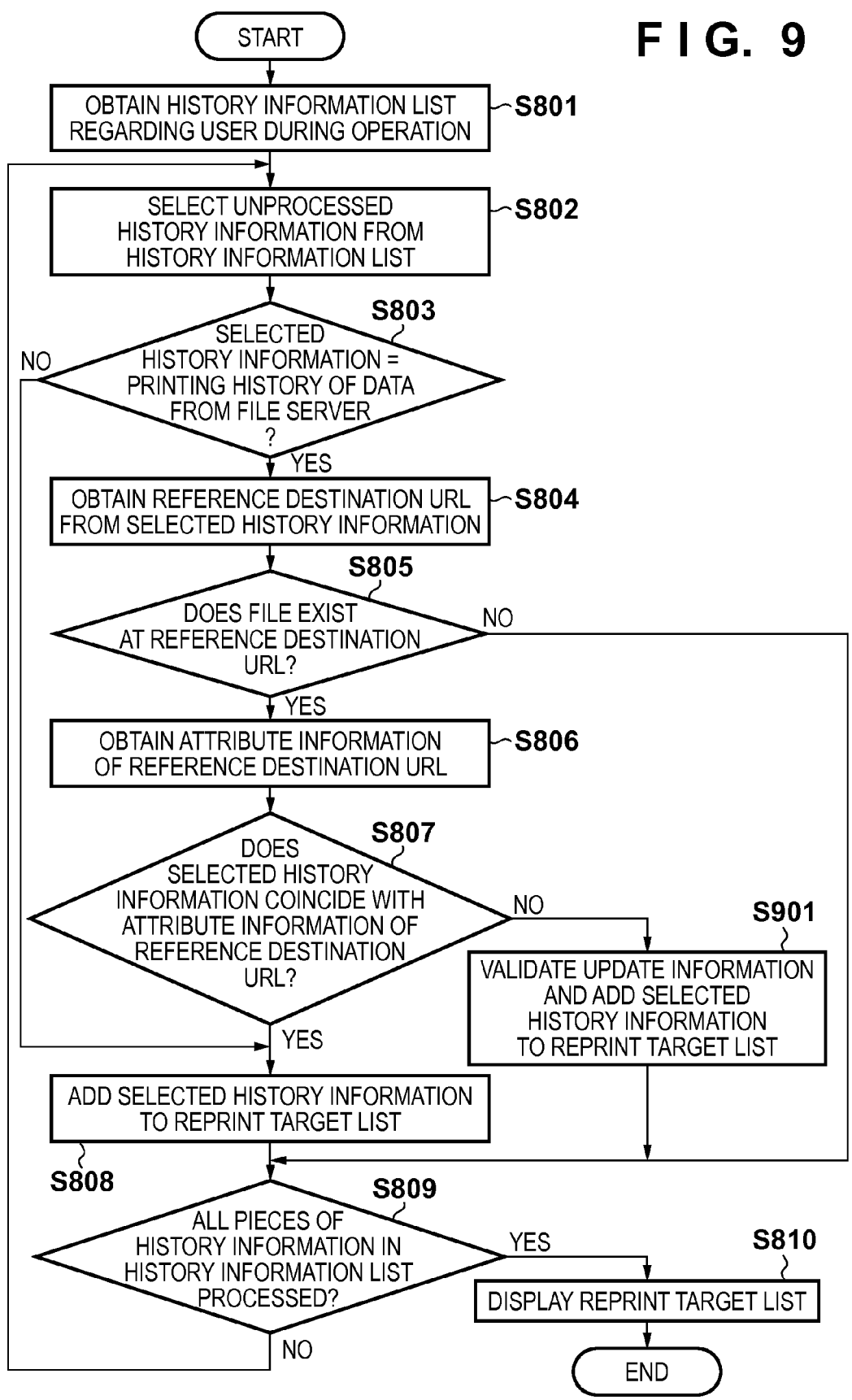
FIG. 9 is a flowchart for explaining processing of displaying a reprint target list by an image forming apparatus according to the second embodiment of the present invention.
Figure 10:
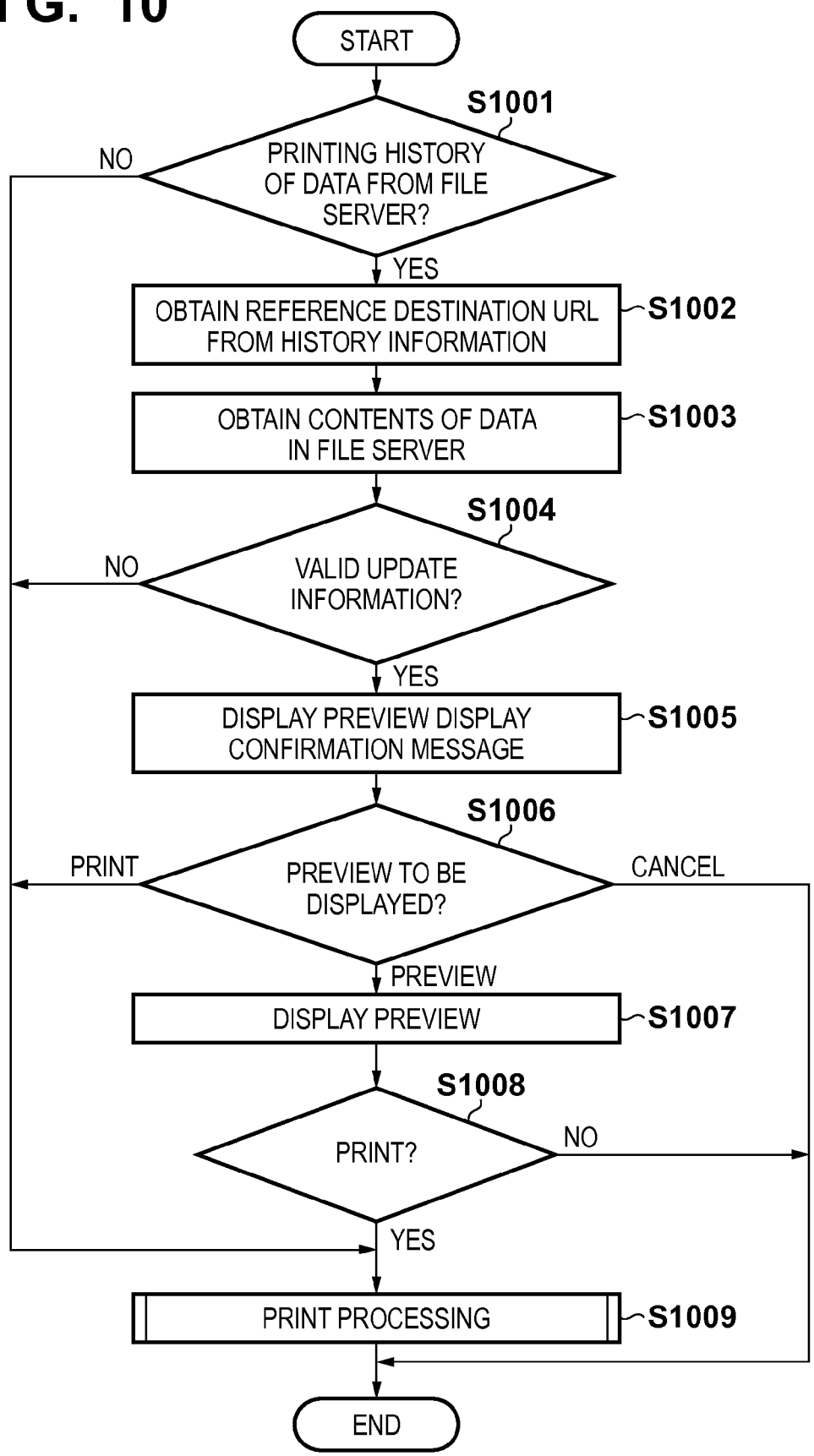
FIG. 10 is a flowchart for explaining reprint processing by the image forming apparatus according to the second embodiment of the present invention.

FIG. 9 is a flowchart for explaining processing of displaying a reprint target list by the image forming apparatus according to the second embodiment.

In step S806, a reprint processing unit 311 obtains attribute information of a data file indicated by a reference destination URL obtained in step S804, and then the process advances to step S807. In step S807, the reprint processing unit 311 determines whether the attribute information of the data file in the file server that has been obtained in step S806 coincides with attribute information recorded in history information selected in step S802. If the reprint processing unit 311 determines in step S807 that the pieces of history information do not coincide with each other, the process advances to step S901, and the reprint processing unit 311 adds the history information selected in step S802 to the reprint target list together with information representing that the data file has been updated.

For example, the reprint target list is a collection of pieces of target history information, as described above. Together with the history information, an item representing update information is held. By validating the item representing update information, it can be determined whether a data file in the file server has been updated. If the item representing update information of the reprint target list is not explicitly validated in step S901, the item representing update information becomes invalid. In step S808, the reprint processing unit 311 adds the history information selected in step S802 to the reprint target list. The history information selected in step S802 is set as a reprint target because the data file in the file server exists and has not been changed and the same printing as previous printing can be executed. The reprint target list describes history information printed before by the user regardless of whether the file in the file server has been updated, out of all pieces of history information managed by a history manager 309. As for updated data, the item representing update information of the reprint target list is valid, and it can be determined that the data has been updated. When displaying the reprint target list in step S810, the display of the updated file may be changed to represent that it has been updated. For example, the color of updated history information may be changed, or a character or icon representing that a file has been updated may be displayed.

The flowchart of FIG. 10 will be explained. FIG. 10 is a flowchart for explaining reprint processing by the image forming apparatus 202 according to the second embodiment. Note that a program which executes this processing is loaded into a RAM 102 in execution, and executed under the control of a CPU 101.

This processing starts when the user selects history information from a displayed reprint target list and designates reprinting.

In step S1001, the reprint processing unit 311 determines whether history information selected by the user is history information of a data file in the file server. This processing is the same as that in step S803. If the reprint processing unit 311 determines in step S1001 that reprinting of a data file in the file server is not designated, the process advances to step S1009 to print data of the selected history information. If the reprint processing unit 311 determines in step S1001 that reprinting of a data file in the file server is designated, the process advances to step S1002, and the reprint processing unit 311 obtains a reference destination URL from the selected history information. Then, the process advances to step S1003, and the reprint processing unit 311 obtains the data contents of a data file indicated by the reference destination URL obtained in step S1002. More specifically, the reprint processing unit 311 requests a network controller 310 to access the file server described in the reference destination URL and obtain the contents of the data file.

In step S1004, the reprint processing unit 311 checks the history information of the reprint target list, and determines whether an item representing that the data file in the file server has been updated is valid. If the item representing that the data file in the file server has been updated is invalid, the process advances to step S1009 to perform print processing using the data obtained in step S1003 because the data file in the file server has not been updated. If the item representing that the data file in the file server has been updated is valid, the process advances to step S1005, and the reprint processing unit 311 displays a confirmation message on an operation unit 106.

Figure 11:
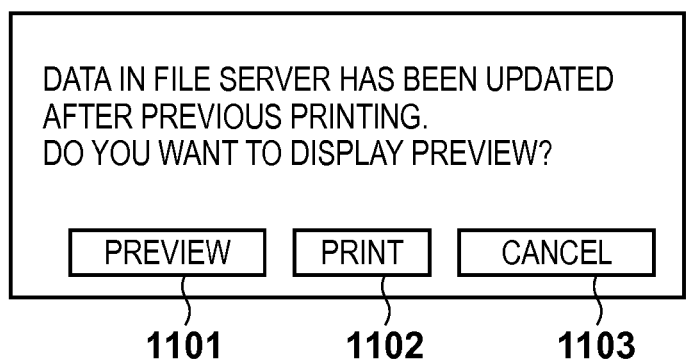
FIG. 11 is a view exemplifying a confirmation message displayed in step S1005 of FIG. 10.

FIG. 11 is a view exemplifying a confirmation message displayed in step S1005. In FIG. 11, when the user selects a "preview" button 1101, the preview of the contents of a data file is displayed. When the user selects a "print" button 1102, the data file is printed without displaying a preview. When the user selects a "cancel" button 1103, reprint processing for data of the selected history information is canceled.

The process advances to step S1006, and the reprint processing unit 311 determines a response to the message (FIG. 11) displayed in step S1005. If the user designates printing without displaying a preview, the process advances to step S1009 to execute printing. If the user selects the preview, the process advances to step S1007; if he designates cancellation, ends. In step S1007, the reprint processing unit 311 displays the preview of the data obtained in step S1003 on the operation unit 106.

Figure 12:
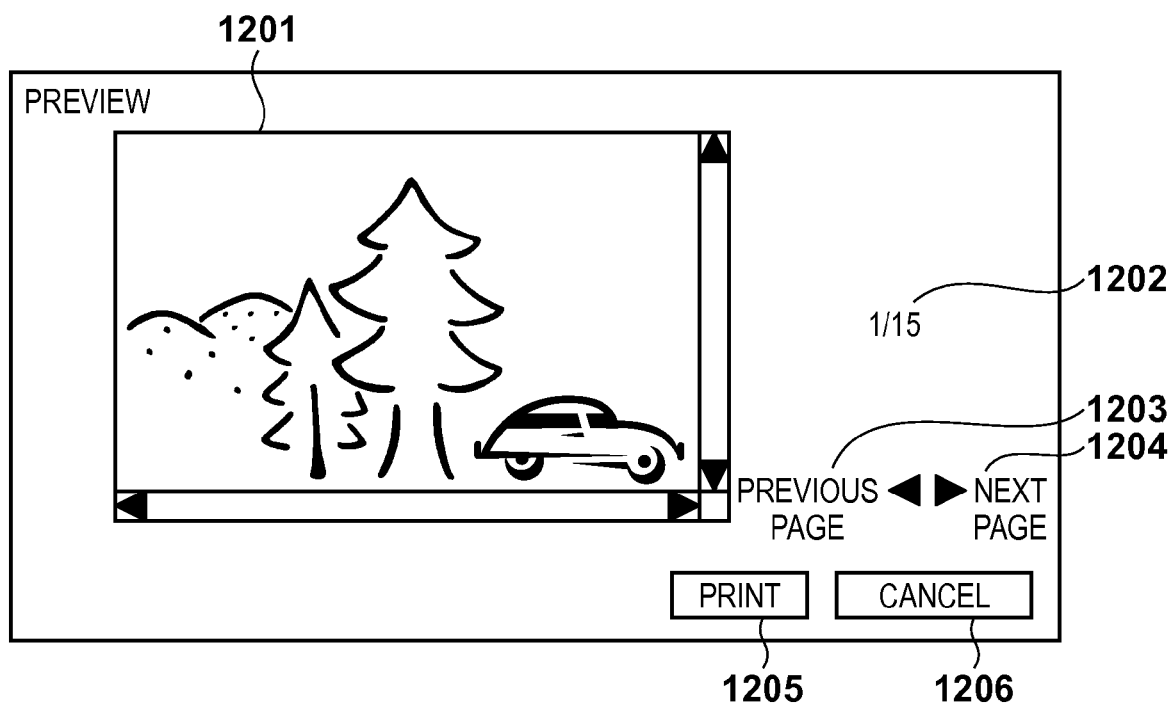
FIG. 12 is a view exemplifying a preview display in reprinting.

FIG. 12 is a view exemplifying a preview display in reprinting. An area 1201 displays the preview of a selected page. An item 1202 displays the number of a page during display and a total page count. In FIG. 12, "1/15" is displayed in this item and represents that the first page in a total of 15 pages is displayed. A button 1203 is a page return button, and a button 1204 is a page feed button. The buttons 1203 and 1204 are used to display pages preceding and succeeding a page during display. When the user selects a print button 1205, data during display is printed. When the user selects a cancel button 1206, the process ends without printing data during display.

The preview display in FIG. 12 is merely an example, and is not limited to this. For example, the preview display may allow setting a magnification to enlarge or reduce the display, or allow directly inputting a page number to display the designated page.

Thereafter, the process advances to step S1008, and the reprint processing unit 311 determines a response to the preview display in step S1007. If the user designates printing, the process advances to step S1009; if he designates cancellation, ends. In step S1009, the reprint processing unit 311 instructs an image output controller 303 to execute printing, thereby printing. The processing by the image output controller 303 in step S1009 is the same as that described in the first embodiment, and a description thereof will not be repeated.

In the second embodiment, in the flowchart of FIG. 10, the message shown in FIG. 11 is displayed in step S1005 to confirm whether to display the preview of the contents of a data file. However, this data file is an updated data file, and the preview may be forcibly displayed without displaying the confirmation message. This can be implemented by, if YES in step S1004 of the flowchart of FIG. 10, skipping the processes in steps S1005 and S1006 and advancing to step S1007.

After generating a reprint target list in the flowchart of FIG. 9, data in the file server may be updated until the user selects history information and designates reprinting to obtain the data in the flowchart of FIG. 10. To prevent this, after obtaining a data file in the file server in step S1003, attribute information of the data file may be obtained and compared with attribute information of history information to check whether the data in the file server has not been updated.

This will be exemplified in more detail, similar to the first embodiment. Assume that the user "yamada" operates the image forming apparatus 202, and requests reprinting. The reprint processing unit 311 requests only history information of the user "yamada" of the history manager 309. A history information list obtained by extracting only pieces of history information of the user "yamada" is as shown in FIGS. 16A and 16B. The reprint processing unit 311 sequentially searches the attribute information list in FIG. 16A.

First, the reprint processing unit 311 checks history information 1601. Since the job type is "COPY", the reprint processing unit 311 adds the history information to the reprint target list.

Then, the reprint processing unit 311 checks history information 1602. Since the job type is "NET", the reprint processing unit 311 checks the table in FIG. 16B for history information corresponding to an external file attribute ID "49". Since the ID "49" corresponds to history information 1607 in FIG. 16B, the reprint processing unit 311 obtains the reference destination URL and protocol of the history information, accesses a file server indicated by the reference destination URL using the obtained protocol, and checks whether data exists. This example assumes that corresponding data files exist in the file server for all the history information 1602, history information 1604, and history information 1606, as assumed above. Since the data file exists, the reprint processing unit 311 obtains attribute information of the reference destination URL from the file server. Assume that the update date & time of the data file in the file server is "2010.9.8 09:51:03" and the file size is "30291 bytes". The obtained pieces of attribute information coincide with the update date & time and file size of the history information 1607. Thus, the reprint processing unit 311 adds the pieces of history information 1602 and 1607 to the reprint target list.

After that, the reprint processing unit 311 checks history information 1603. Since the job type is "PDL", the reprint processing unit 311 adds the history information to the reprint target list.

The reprint processing unit 311 checks the history information 1604, similar to the history information 1602. Also in this case, the data file exists in the file server, so the reprint processing unit 311 obtains attribute information of the reference destination URL of the history information 1604 from the file server. Assume that the update date & time of the data file in the file server is "2011.2.26 12:08:41" and the file size is "8372 bytes". The obtained pieces of attribute information do not coincide with the update date & time item and file size item in history information 1608. The reprint processing unit 311 validates the item representing that the data file in the file server has been updated, and adds the pieces of history information 1604 and 1608 to the reprint target list.

The reprint processing unit 311 then checks history information 1605. Since the job type is "COPY", the reprint processing unit 311 adds the history information to the reprint target list.

Finally, the reprint processing unit 311 checks the history information 1606, similar to the history information 1602. Since the data file exists in the file server, as assumed above, the reprint processing unit 311 obtains, from the file server, attribute information indicated by the reference destination URL of the history information 1606.

Assume that the update date & time of the data file in the file server is "2011.3.14 16:11:37" and the file size is "4085 bytes". In this case, the obtained pieces of attribute information do not coincide with the update date & time item and file size item in history information 1609. The reprint processing unit 311 validates the item representing that the data file in the file server has been updated, and adds the history information to the reprint target list. As a result, all the pieces of history information 1601 to 1606 remain in the reprint target list and are to undergo reprinting.

As for the pieces of history information 1604 and 1606, the reprint target list describes that the data files in the file server have been updated.

FIG. 18 is a view exemplifying a history information screen display for reprinting. In FIG. 18, all pieces of history information corresponding to the user "yamada" are displayed. Icons 1801 and 1802 each representing that a data file in the file server has been updated are displayed in correspondence with the pieces of history information 1604 and 1606 for each of which a data file in the file server has been updated.

According to the second embodiment, when reprinting data updated in the file server, a print preview can be displayed to allow the user to confirm the print contents and then execute reprinting. This can prevent generation of a printing result the user does not want.

Third Embodiment

The third embodiment in which whether a data file in a file server has been updated is confirmed not before displaying a reprint target list but in executing reprinting will be described. The third embodiment is effective when whether a data file in a file server has been updated cannot be confirmed before displaying a reprint target list. For example, assume that the file server requires authentication, and user information used in authentication executed in the use of an image forming apparatus 202 and user information of the file server are not associated. In this case, if the file server is accessed before displaying a reprint target list, the operation becomes complicated. More specifically, when displaying a reprint target list, all file servers described in history information need to be authenticated, and an authentication screen for the file server appears repetitively. This also applies to a case in which authentication information for a file server is not recorded in history information when the image forming apparatus 202 is usable without authentication or does not belong to the domain of an authentication system.

A description of the same parts as those in the second embodiment will not be repeated. In the third embodiment, all pieces of history information of a user during operation are only added as reprint targets to a reprint target list in a history manager 309. Hence, a description of processing of generating and displaying a reprint target list will not be repeated. Note that the system arrangement and the arrangement of the image forming apparatus 202 according to the third embodiment are the same as those in the first embodiment.

Figure 13:
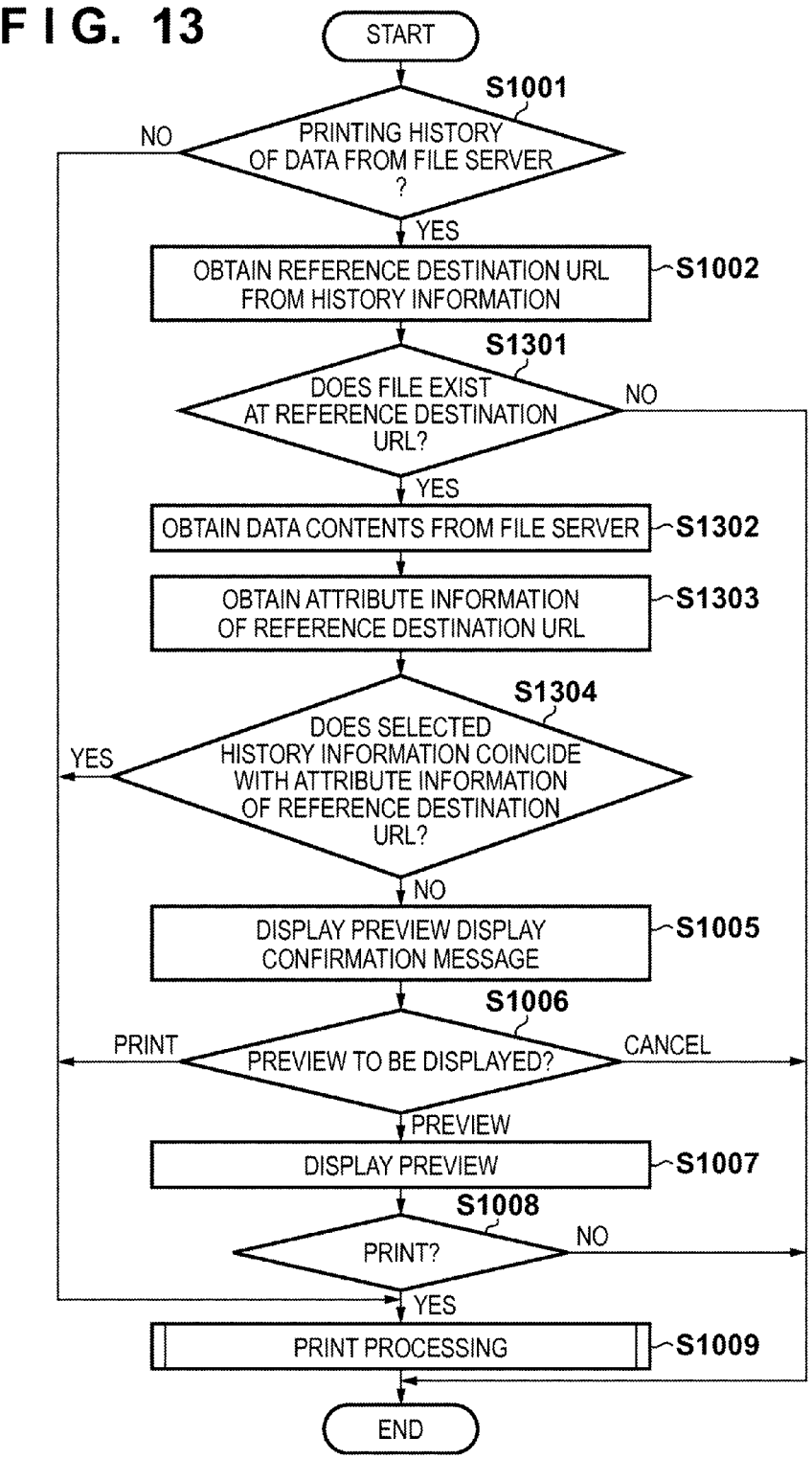
FIG. 13 is a flowchart for explaining reprint processing by an image forming apparatus according to the third embodiment of the present invention.

FIG. 13 is a flowchart for explaining reprint processing by the image forming apparatus 202 according to the third embodiment. Note that a program which executes this processing is loaded into a RAM 102 in execution, and executed under the control of a CPU 101.

This processing starts when the user selects history information from a reprint target list and designates reprinting. In FIG. 13, the same reference numerals as those in the flowchart of FIG. 10 denote the same processes, and a description thereof will not be repeated.

In step S1301, a reprint processing unit 311 accesses a file server indicated by a reference destination URL obtained in step S1002, and determines whether a data file exists in the file server. Detailed processing is the same as that in step S805. If the reprint processing unit 311 determines in step S1301 that no data file exists in the file server indicated by the reference destination URL, the process ends. This is because a previously printed data file has already been deleted from the file server and no file to be reprinted exists.

If the reprint processing unit 311 determines in step S1301 that a data file exists in the file server indicated by the reference destination URL, the process advances to step S1302, and the reprint processing unit 311 obtains the data contents of a data file indicated by the reference destination URL obtained in step S1002. More specifically, the reprint processing unit 311 requests a network controller 310 to access the file server described in the reference destination URL and obtain the contents of the data file. The process then advances to step S1303, and the reprint processing unit 311 obtains attribute information of the data file in the file server indicated by the reference destination URL obtained in step S1002. More specifically, the reprint processing unit 311 requests the network controller 310 to access the file server described in the reference destination URL and obtain attribute information of the data file.

The process advances to step S1304, and the reprint processing unit 311 determines whether the attribute information of the data file of the file server that has been obtained in step S1303 coincides with attribute information recorded in the history information. This processing is the same as that in step S807. If the reprint processing unit 311 determines in step S1304 that the pieces of attribute information coincide with each other, the process advances to step S1009 to perform print processing. This is because the data file in the file server has not been updated after previous printing. If the reprint processing unit 311 determines in step S1304 that the pieces of attribute information do not coincide with each other, the process advances to step S1005 to display a preview confirmation message, in order to prompt the user to confirm the date file on the preview because the previously printed data file has been changed in the file server.

According to the third embodiment, even if whether a data file in a file server has been updated cannot be confirmed before displaying a reprint target list, the preview of updated data can be displayed in reprinting, thereby preventing generation of a printing result the user does not want.

Fourth Embodiment

Assume that print data which has been generated in previous printing and converted into a format printable by an image forming apparatus is held as history information of a data file in a file server together with a reference destination URL, similar to a job type regarding another printing such as copying or PDL. At this time, when the data file in the file server is updated, the previews of both data before update held in the history information and updated data in the file server are displayed to prompt the user to select either of them. The fourth embodiment will explain this example. Note that the system arrangement and the arrangement of an image forming apparatus 202 according to the fourth embodiment are the same as those in the first embodiment.

Figure 14:
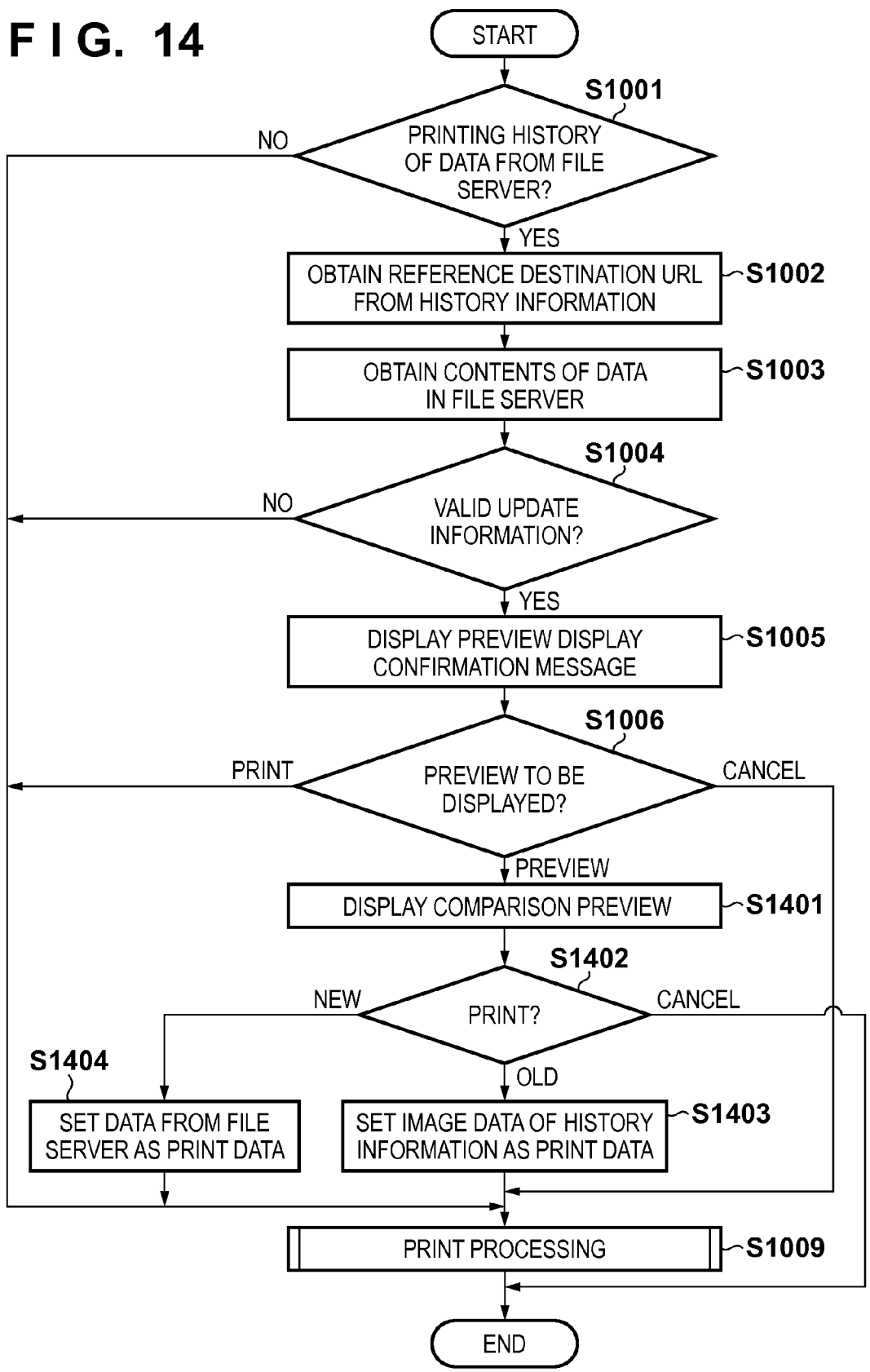
FIG. 14 is a flowchart for explaining reprint processing by an image forming apparatus according to the fourth embodiment of the present invention.

FIG. 14 is a flowchart for explaining reprint processing by the image forming apparatus 202 according to the fourth embodiment. Note that a program which executes this processing is loaded into a RAM 102 in execution, and executed under the control of a CPU 101.

This processing starts when the user selects history information from a reprint target list displayed by the above-described processing of the flowchart of FIG. 9, and designates reprinting. In FIG. 14, the same reference numerals as those in the flowchart of FIG. 10 denote the same processes, and a description thereof will not be repeated.

In step S1401, a reprint processing unit 311 displays, on an operation unit 106, the preview of the contents of a data file in a file server that have been obtained in step S1003, and that of the contents of data in a format printable by the image forming apparatus 202 that are stored in history information.

Figure 15:
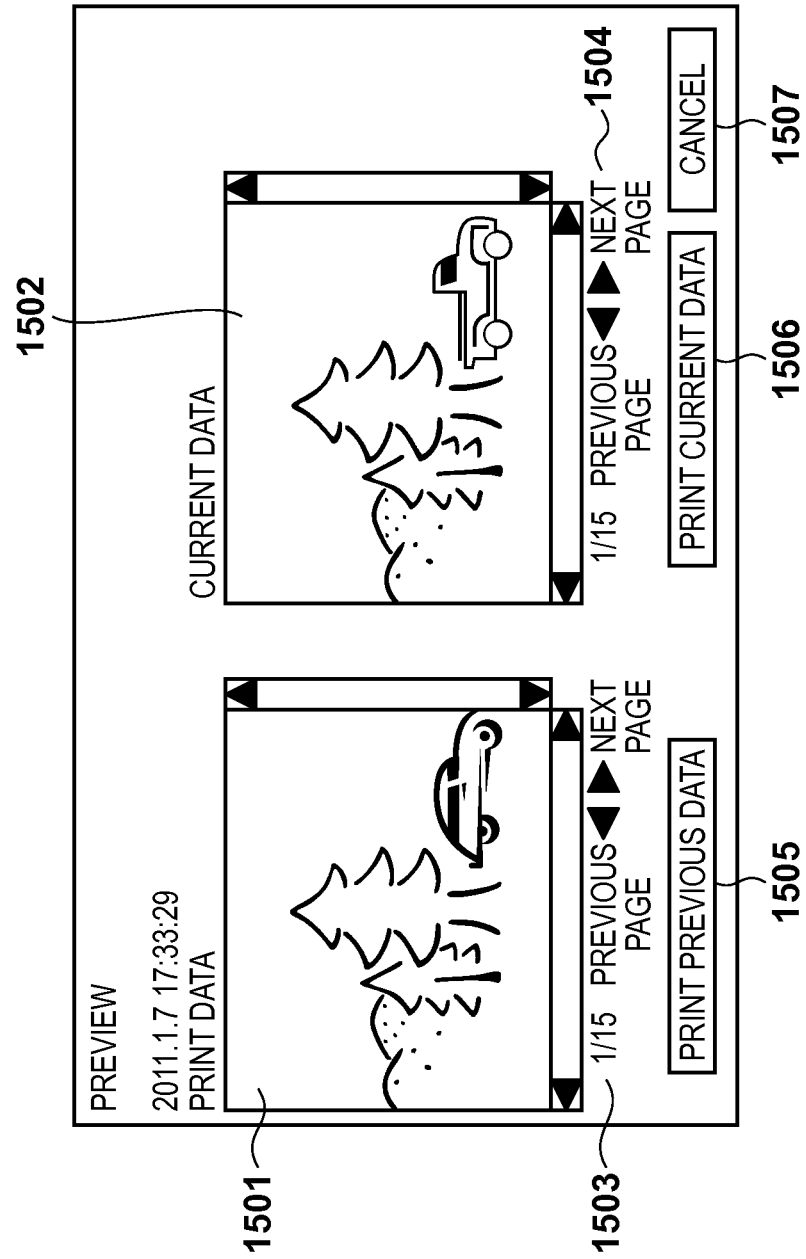
FIG. 15 is a view exemplifying a preview display according to the fourth embodiment of the present invention.

FIG. 15 is a view exemplifying a preview display according to the fourth embodiment. An area 1501 displays the preview of previously printed data. An area 1502 displays the preview of a data file updated in the file server. An item 1503 displays the number of a page during display, a total page count, a page return button, and a page feed button for the preview of the previously printed data. The item 1503 corresponds to an item 1202, button 1203, and button 1204 in FIG. 12. An item 1504 displays the number of a page during display, a total page count, a page return button, and a page feed button for the preview of the current data updated in the file server. The item 1504 also corresponds to the item 1202, button 1203, and button 1204 in FIG. 12.

A button 1505 is used to designate printing of previously printed data. When the user selects the button 1505, previously printed data is printed. That is, the data file before update in the file server is printed. A button 1506 is a print button for the data file updated in the file server. When the user selects the button 1506, the data file updated in the file server is printed. When the user selects a cancel button 1507, the process ends without reprinting data. Note that the preview display in FIG. 15 is merely an example, and is not limited to this.

Thereafter, the process advances to step S1402, and the reprint processing unit 311 determines a response to the preview display in step S1401. If the user designates reprinting of the previously printed data, the process advances to step S1403. If the user designates reprinting of the data updated in the file server, the process advances to step S1404; if he designates cancellation, ends. In step S1403, the reprint processing unit 311 obtains, from the history information, image data which has been generated in previous printing and converted into a format printable by the image forming apparatus 202, and sets it as data used for printing. In step S1404, the reprint processing unit 311 sets, as data used for printing, the data file in the file server that has been obtained in step S1003. In this manner, the data set to be used in printing in step S1403 or S1404 is printed in step S1009. In step S1009, the reprint processing unit 311 instructs an image output controller 303 to execute printing, thereby printing. The processing by the image output controller 303 in step S1009 is the same as that described in the first embodiment, and a description thereof will not be repeated.

According to the fourth embodiment, even when a data file in a file server has been updated, the contents of the data file in the file server and those of previously printed data can be compared on the preview display. This enables the user to obtain a result of printing data he wants.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-139860, filed Jun. 23, 2011, which is hereby incorporated by reference herein in its entirety.

What is claimed is:

1. A printing apparatus comprising:
   a storage unit configured to store an execution history of a print job;
   a reprint unit configured to execute reprinting based on the execution history of the print job that is stored in the storage unit; and
   a control unit configured to determine an execution history of a print job for printing data obtained by accessing data stored in a file server on a network, from execution histories of print jobs that are stored in the storage unit, and to restrict reprinting based on the determined execution history.

2. The printing apparatus according to claim 1, wherein the execution history of the print job that is stored in the storage unit includes print data used to execute the print job.

3. The printing apparatus according to claim 2, wherein the execution history of the print job for printing data obtained by accessing data stored in the file server includes information indicating a storage destination of the data stored in the file server.

4. The printing apparatus according to claim 1, wherein the control unit permits reprinting for a print job for which attribute information of print data stored in the storage unit coincides with attribute information of data stored in the file server, out of print jobs for printing data obtained by accessing data stored in the file server on the network.

5. The printing apparatus according to claim 4, wherein when a user who updated data stored in the file server and a user who requests display of a list of jobs to be reprinted coincide with each other, the control unit permits reprinting even for a print job for which attribute information of print data stored in the storage unit does not coincide with attribute information of data stored in the file server, out of print jobs for printing data obtained by accessing data stored in the file server on the network.

6. The printing apparatus according to claim 1, further comprising a list display unit configured to display a list of execution histories of print jobs.

7. The printing apparatus according to claim 6, wherein even when attribute information of print data stored in the storage unit does not coincide with attribute information of data stored in the file server for a print job out of print jobs for printing data obtained from the file server via the network, the list display unit adds, to a list of jobs to be reprinted, a job which printed the print data, and displays the job in a state where the job can be discriminated from another print job.

8. The printing apparatus according to claim 1, further comprising an inquiry unit configured to, when the print job is a job for printing data obtained from the file server via the network, inquire a user whether to display a preview of the data before reprinting by the reprint unit.

9. The printing apparatus according to claim 1, further comprising a preview display unit configured to display a preview of data stored in the file server when the print job is a job for printing data obtained from the file server via the network.

10. The printing apparatus according to claim 9, wherein the preview display unit displays a preview of print data stored in the storage unit.

11. A method for controlling a printing apparatus, comprising:
   storing an execution history of a print job in a storage unit;
   executing reprinting based on the execution history of the print job that is stored in the storage unit;
   determining an execution history of a print job for printing data obtained by accessing data stored in a file server on a network, from execution histories of print jobs that are stored in the storage unit, and
   restricting reprinting based on the determined execution history.

12. A non-transitory computer-readable storage medium storing a computer program for causing a computer to execute steps of a method for controlling a printing apparatus, the method comprising:
   storing an execution history of a print job in a storage unit;
   executing reprinting based on the execution history of the print job that is stored in the storage unit;
   determining an execution history of a print job for printing data obtained by accessing data stored in a file server on a network, from execution histories of print jobs that are stored in the storage unit, and
   restricting reprinting based on the determined execution history.

* * * * *